United States Patent [19]

Kim et al.

[11] Patent Number: 5,459,809
[45] Date of Patent: Oct. 17, 1995

[54] CHARACTER RECOGNITION SYSTEM AND METHOD THEREFOR ACCOMMODATING ON-LINE DISCRETE AND CURSIVE HANDWRITTEN

[75] Inventors: Jin-Hyung Kim, 101-1401, Hanbich Apt., 99, Eoun-dong, Yooseong-gu; Jin-Young Ha, both of Daejeon; Se-Chang Oh, Seoul, all of Rep. of Korea

[73] Assignee: Jin-Hyung Kim, Daejeon, Rep. of Korea

[21] Appl. No.: 121,494

[22] Filed: Sep. 16, 1993

[30] Foreign Application Priority Data

Mar. 15, 1993 [KR] Rep. of Korea ............... 1993/3917

[51] Int. Cl.[6] ............................................. G06K 9/66
[52] U.S. Cl. ...................... 382/160; 382/228; 395/2.65
[58] Field of Search ................... 382/13, 14, 21, 382/39, 36, 37, 38, 159, 160, 228; 395/2.65; 381/43

[56] References Cited

U.S. PATENT DOCUMENTS

| | | | |
|---|---|---|---|
| 4,653,107 | 3/1987 | Shojima et al. | 382/13 |
| 4,764,972 | 8/1988 | Yoshida et al. | 382/13 |
| 4,819,271 | 4/1989 | Bahl et al. | 395/2.65 |
| 5,040,222 | 8/1991 | Muroya | 382/13 |
| 5,105,468 | 3/1992 | Guyon et al. | 382/14 |
| 5,113,452 | 5/1992 | Chatani et al. | 382/13 |
| 5,199,077 | 3/1993 | Wilcox et al. | 381/43 |
| 5,392,363 | 2/1995 | Fujisaki et al. | 382/13 |

OTHER PUBLICATIONS

He et al. "Handwritten Word Recognition using HMM with adaptive length Viterbi Algorithm", IEEE ASSP Conf. Cat No. 92CH3103-9 pp. 153-6 vol. 3, 1992.

Kundo et al. "Recognition of Handwritten Word: First & Second Order Hidden Markov Model Based Approach", CVPR Proceedings 1988 Cat No. 88 CH2605-4 pp. 457-462, 1988.

"Off-Line and on-line methods for cursive handwriting recognition", J. Camillerapp et al. pp. 253-264, 1991.

"Algorithms and Architectures for Dynamic Programming on Markov Chains", Bliss et al. IEEE Transactions on Signal Processing V37,#6 Jun. 1989 pp. 900-912.

*Primary Examiner*—Michael I. Razavi
*Assistant Examiner*—Larry J. Prikockis
*Attorney, Agent, or Firm*—Robert E. Bushnell

[57] ABSTRACT

Hidden Markov models (HMMs) are used in a system for recognizing on-line English characters. Input data from a tablet is represented as chain codes and HMMs are trained in character units for recognition. During HMM training, imaginary strokes are inserted into actual character strokes of input data and distances between adjacent points of the strokes are normalized. The input data is converted into chain codes, HMM-trained and then constructed into circular HMMs. Characters to be recognized are inserted with imaginary strokes, normalized, converted into chain codes, and then fed into the constructed circular HMMs, thereby enabling recognition.

30 Claims, 16 Drawing Sheets

CHARACTER RECOGNITION SYSTEM AND METHOD THEREFOR ACCOMMODATING ON-LINE DISCRETE AND CURSIVE HANDWRITTEN

BACKGROUND OF THE INVENTION

The present invention relates to an English character recognition system and method, and more particularly to a system and method for recognizing, in an on-line state, received handwritten cursive script English characters using a circular hidden Markov model.

Generally, in character recognition processes, there are on-line recognition methods and off-line recognition methods. It is our observation that many of these methods are, due to their intrinsic characteristics, unsatisfactory in particular aspects.

In the off-line recognition method, previously written characters are read through a scanner to be stored in a predetermined region, and then are recognized by thinning or by a boundary extracting process. A detailed description of this type of method can be found in Korean Patent Application No. 90-18517.

In the on-line recognition method, a tablet is connected to a computer, thereby enabling the use of electronic ink. The electronic ink indicates the result of recognition by printing or on the monitor by internally processing the result obtained by movement of an electronic pen upon the tablet. This is essential in an on-line handwriting recognition method. Accordingly, this method can recognize characters, including cursive characters, manually written on the tablet with an electronic pen by a human hand in real time.

Nowadays, with the development of graphic tablet techniques, the computer having powerful computation capabilities, and of a pen computer, a growing interest in the on-line character recognition method is being seen. On-line English recognition systems have been developed and have been put on the market, partly at universities, laboratories and companies. Most of them recognize only precisely handwritten characters. That is, they can not recognize cursive handwriting. Accordingly, such systems do not provide convenient and unconstrained handwriting recognition for users because of the problem of character segmentation, i.e. segmentation of an input word into characters. Also, another problem arises from the handling of mixed character styles, because very different shapes are used for some characters according to the varied writing style of users.

In the on-line character recognition method, hidden Markov models (hereinafter, referred to as "HMMs") are sometimes used. In HMMs, sequential information is modeled according to time. The characteristic of the HMM lies in its outstanding modeling power.

The HMM technique has been often applied to speech recognition fields, as disclosed in U.S. Pat. No. 4,819,271 to Bahl et al. This obtains a better result than a matching method using a conventional dynamic program as disclosed in the IEEE, Vol. 77, No. 2, Feb. 1989, pp. 257–285 by L. R. Rabiner. Since character information X, Y of on-line character data is also sequentially generated according to time, like sound signals, the above technique can be easily used in a character recognition method.

Among the several examples using the HMM technique for character recognition include a method disclosed in *Script Recognition Using Hidden Markov Models* by R. Nag, K. H. Wong and F. Fallside published in IEEE ASSP pp. 2071–2074, 1986. In this recognition method, cursive English input data is convened into short vectors having the same length, and is HMM-trained by extracting quantized angle changes and several other characteristics. From this information, recognition of word units is performed. In this method, the recognition rate of the handwriting of one specific person is high, but the rate for untrained handwriting by another person is low. Accordingly, there is a problem in that this method can not be commonly used for recognition of the handwriting of many persons.

Another character recognition method is disclosed in *A Hierarchical System For Character Recognition With Stochastic Knowledge Representation* issued in 1988 by J. A. Vlantzos and S. Y. Kung, pp. 1-601–1-608. This is an example of using HMM in off-line English language recognition. The characteristic of this recognition method is a hierarchical structure of three levels: sentence level, word level and letter level. In character recognition, recognition in the character unit mode is performed by scoring a character level model. Words or sentences are recognized by finding optimal state sequences in an upper level.

A. Kundu and P. Bahl disclose off-line cursive English recognition in the IEEE Proceedings of International Conference on Acoustics, Speech, and Signal Processing, 1988, pages 928–931. For this type of off-line English language recognition, one HMM composed of twenty-six states is first constructed, and state transition probabilities are obtained using statistical values obtained from English text. After optimal code-book symbol states of input data are found using an action quantization VQ algorithm (i.e., a "VQ"), output probabilities are obtained by searching distributions shown in the respective states. Then, inputs in word units are divided into character units, and code-book symbols nearest to the respective characters are found. Next, the symbol sequence is fed into a HMM, and the best state sequence is found using a Viterbi algorithm, thereby enabling recognition of a word. This method however, does not show a method of dividing a word into characters, and therefore has a substantially lower recognition efficiency.

*Off-line And On-line Methods For Cursive Handwriting Recognition,* by J. Camillerapp, et al. is published in "Proceedings of Interbational Workshop on Frontiers in Handwriting Recognition, Chateau de Bonas, France, 1991. This paper discloses that a MM (Markov Model) is applied to on-line cursive English character recognition. Input data is converted into chain code vectors of predetermined magnitude, from which model word units are trained. Then, a recognition experiment is performed. This experiment is done with first-order MMs, second-order MMs and third-order MMs, among which third order MMs show the best results. A recognition rate of 66% can be obtained for fifty five words.

In most of the conventional character recognition methods, however, inaccurate character separation adversely affects character recognition, and handling for connection between adjacent characters in extended cursive style is not performed, thereby reducing the recognition rate.

SUMMARY OF THE INVENTION

Accordingly, it is an object of the present invention to provide an improved character recognition process and circuit.

It is another object to provide a cursive script character recognition method and circuit that solves the conventional problems.

It is another object to provide a method that improves the recognition rate of characters written in cursive.

It is yet another object to provide a method and circuit enabling enhanced recognition of cursive characters by connecting, in a circular structure, additional HMMs for ligatures between characters.

It is still another object to provide a method and system for precisely recognizing English words composed of an arbitrary number of written characters.

It is a further object to provide a method and circuit enabling enhanced recognition of cursive characters without resort to use of extra character separating techniques.

It is still a further object to provide a method of effectively processing characters exhibiting many changes with a hidden Markov model.

It is yet a further object to provide a method and system using ligature models to easily recognize a cursive script and also a mixed shape English word (i.e. cursive styles and discrete styles) by processing ligatures of adjacent characters within a word.

These and other objects may be achieved according to the principles of the present invention with a process of sequentially receiving on-line input data to be recognized and processing stored characters, said input data represented as sequences of coordinates, comprising the steps of training hidden Markov models to represent corresponding character units, said character units having being inserted with an imaginary stroke, having been preprocessed, and having been convened into an output symbol; training hidden Markov models to represent ligatures connecting the character units, said ligatures having been inserted with an imaginary stroke, having been preprocessed, and having been converted into an output symbol; forming circular hidden Markov models by connecting said trained character hidden Markov models with said trained ligature hidden Markov models, for easy recognition in the character recognition mode, using said trained character and ligature hidden Markov models; and recognizing a word by passing an output symbol through said circular hidden Markov models, said input data to be recognized having been received, having been inserted with an imaginary stroke, having been preprocessed, and having been converted into an output symbol.

BRIEF DESCRIPTION OF THE DRAWINGS

The above objects and other advantages of the present invention will become more apparent by describing the preferred embodiments of the present invention with reference to the attached drawings, in which.

DETAILED DESCRIPTION OF THE INVENTION

Hereinafter, a preferred embodiment of the present invention is described in detail with reference to the accompanying drawings. It is noted that the term "character" as used in this description of the present invention, includes a word.

In this description of the present invention, an "actually drawn stroke" is defined as a state characterized by movement of a pen on a tablet from a pen-down position to a pen-up position. A "ligature" is a stroke connecting characters in a word written, for example, using the Roman or English alphabets, in cursive style; and an "imaginary stroke" is a stroke intentionally added between actually drawn characters or between actually drawn strokes in a character. For example, when a lowercase letter, say t, is composed of two actually drawn strokes, namely "l" and "-", a stroke referred to as an "imaginary stroke" is intentionally added in a disconnected portion between the two actually drawn strokes.

Figure 1:
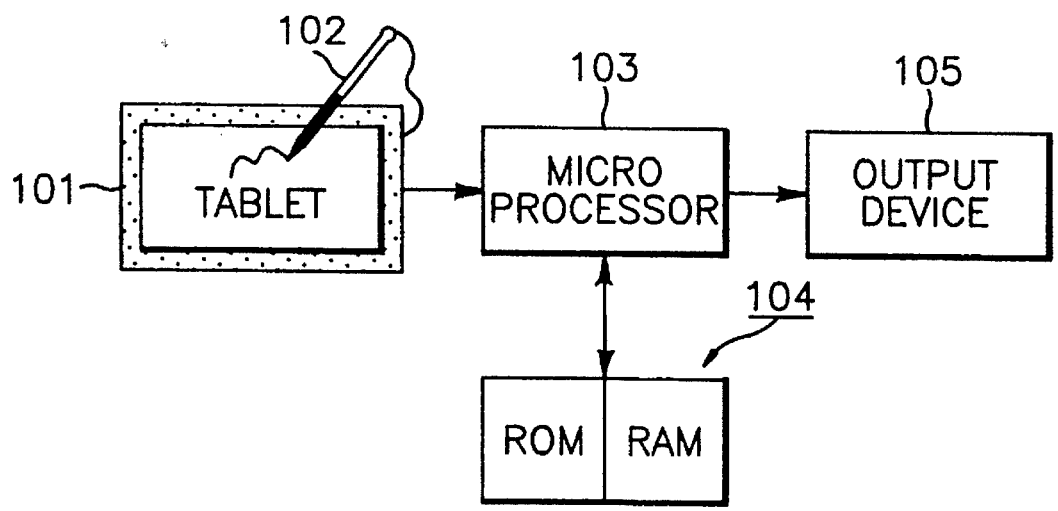
FIG. 1 illustrates an embodiment of a character recognition device constructed according to the principles of the present invention.

Turning now to the drawings, and in particular FIG. 1, an embodiment of a device implementing a character recognition method according to the principles of the present invention is illustrated. Reference numeral 101 is a tablet, which is connected to an electronic pen 102. When electronic pen 102 moves on tablet 101, its varied state drawn according to its movement is generated as digitalized x,y coordinates and state value D. The tablet 101 preferably used in the present invention is by way of example, the "MODEL SD-510C" manufactured by the Japanese WACOM, Co. It should be understood, however, that the present invention is not limited to such a tablet 101. Microprocessor 103, which controls HMM training and recognition processing, receives outputs from the tablet 101.

Memory 104 is composed of a read only memory (hereinafter referred to as "ROM") and a random access memory (hereinafter referred to as "RAM"). In the ROM of the present invention, a character recognition processing program, processed data for a word dictionary, and character and ligature model values trained by HMMs, are stored. To enable recognition of words written in Roman characters such as in the English language, microprocessor 103 should be given a command word by an operator through an outside keyboard. In a model training process, an alphabet training mode and a ligature training mode are separately categorized and a training process for each is performed according to the output data from tablet 101. The results of each training process are then stored in the RAM of memory 104. During training, microprocessor 103 receives from tablet 101, a sequence of X,Y coordinates and information about sequential points drawn by electronic pen 102.

Sequences of X,Y coordinates representative of letters and words cursively written on tablet 101 are generated as binary data, and are stored in the RAM of memory 104 by a commercially available preprocessor or microprocessor 103. From the sequences of X,Y coordinates and state data of points stored in the RAM, strokes of characters in the alphabet, including ligature and imaginary strokes can be identified. A distance between each adjacent point of a merged stroke, that is the actually drawn strokes enhanced with the insertion of imaginary strokes, is normalized according to a predetermined distance. The normalized adjacent coordinates are then converted into chain codes on the basis of the directional angles of vectors between the normalized adjacent coordinates. This data is input and processed until there are no further ligatures and character strokes in the alphabet (a to z) remaining. The chain codes are incorporated into HMMs and the result of this HMM training is recorded. That is, HMMs are used to train the system to recognize the corresponding input characters composed of ligatures and alphabetical character strokes, and the results of the training are stored in memory 104.

In a recognition mode (i.e. not the training mode discussed above), if the training of character and ligature models is complete, the trained ligature and character HMMs are made into a circular structure. Then, when the handwritten characters to be recognized are received as a sequence of coordinates, imaginary strokes are fitted between the actually drawn strokes to form a merged stroke.

The distances between adjacent points of the merged stroke are normalized to establish a constant predetermined distance between the adjacent points of the merged stroke. The normalized adjacent points are then converted into chain codes.

In circular HMMs where the converted chain codes are circulated between the respective models to find optimal paths, i.e. where the trained character ("a" to "z") HMMs and ligature HMMs are interconnected, the optimal path is found and a corresponding word is looked up in the word dictionary stored in the ROM of memory 104. When the corresponding word is identified, it is provided to output device 105 where it can be read by a user.

Recognition of a word written in cursive is performed according to the principles of the present invention with a word recognition program stored in a device such as a hard or floppy disk in response to a command entered through a key board. In one test, the computer used was a SPARC Station II manufactured by SUN Microsystems, Inc.

The Hidden Markov Model (HMM) disclosed in U.S. Pat. No. 4,587,670 issued to Levinson can be used to provide an understanding of certain aspects of the present invention. When the concepts and techniques of Levinson '670 are applied to the present invention, a detailed description is not deemed necessary since such a description is well known to those skilled in the art of the Levinson '670 patent. These concepts will be briefly described, however, to assure a clear understanding of the embodiments of the present invention.

A hidden Markov model may be represented by the following parameter vector $\lambda$:

$$\lambda = (A, B, \Pi), \quad (1)$$

where:

$A = \{a_{i,j}\}$, $(i,j=1, \ldots, S$ (number of node)): node transition $(S_i \rightarrow S_j)$ probability distribution array, $B = \{b_{ij}(y_k)\}$, $(k=1, \ldots, K$ (kind of output symbol)): symbol output probability distribution array in node transition $(S_i \rightarrow S_j)$, and $\Pi = \{\pi_i | \pi_i = P(S_i = 0)\}$: probability distribution array of an initial node (time t=0).

Figure 3:
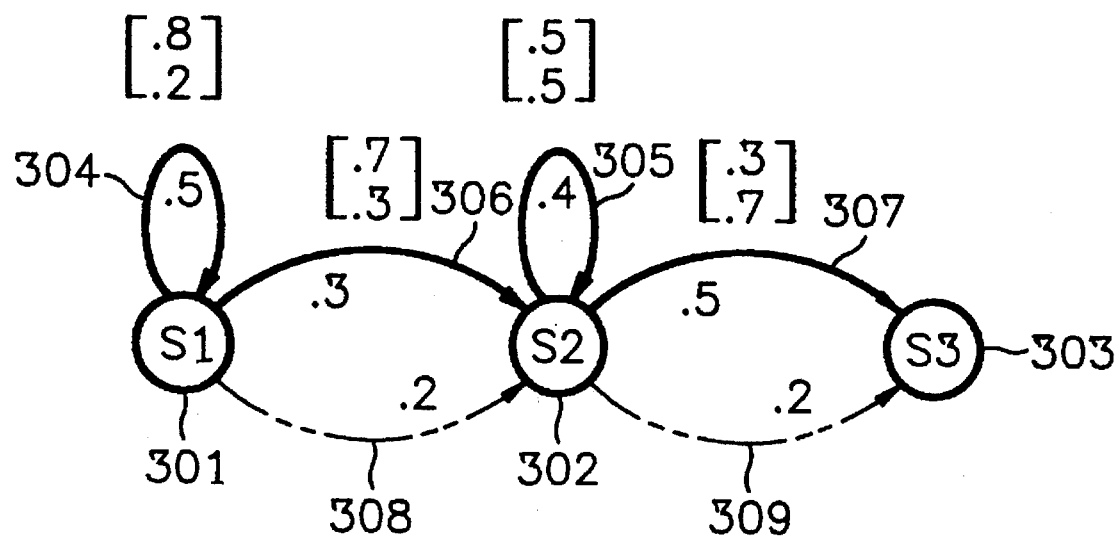
FIG. 3 illustrates the conventional hidden Markov model structure.

FIG. 3 shows an example of a HMM in which the number of nodes is three and the number of output symbols is two, i.e. a and b.

The basic structure of a HMM is a finite state network composed of finite nodes and transitions. The following example shows an output probability:

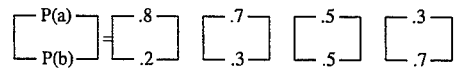

Each node can be called a state, and transitions can be divided into arcs that provide transition between nodes of output symbols and null-arcs that provide transition between nodes, but are not a component of an output symbol. Referring to the model of FIG. 3, there are three nodes $S_1$ to $S_3$, 301 to 303 (represented as circles), and six transitions 304 to 309 which are composed of four arcs 304–307, and two null-arcs 308 and 309. Also, there are two kinds of output symbols, i.e. a and b. For example, in the second node $S_2$ 302, there are two transitions 306 and 308 from the node $S_1$ 301, and one self-transition 305 to the same node $S_2$ 302. Among transitions from the node $S_1$ 301 to $S_3$ 303, the solid lines 304–307 represent arcs and the two-dotted lines 308 and 309 represent null-arcs. The arc from a node $S_i$ to a node $S_j$ has a transition probability $a_{ij}$ and an output probability distribution $b_{ij}(K)$ that has a probability distribution for every symbol capable of being read. When a transition is generated through the arc from the node $S_1$ 301 to $S_2$ 302, the probability of observing the output symbol "a" is 0.7 and the probability of observing the output symbol "b" is 0.3. Also, the transition probability is 0.3.

Figure 14A:
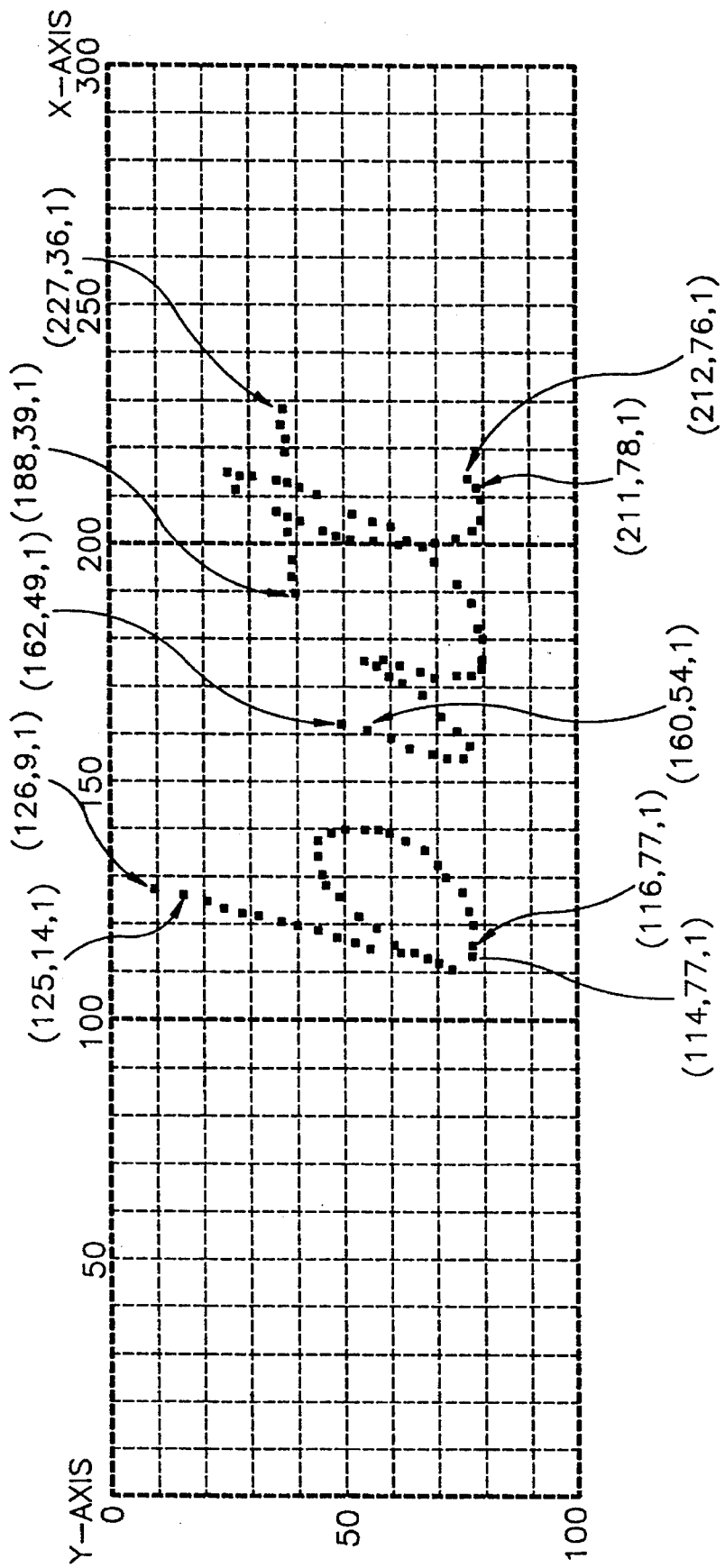
FIGS. 14A and 14B show "b ul" as presented to normalize point-distances of a merged stroke having inserted imaginary strokes to describe the operational characteristics of an embodiment constructed according to the principles of the present invention.
Figure 14B:
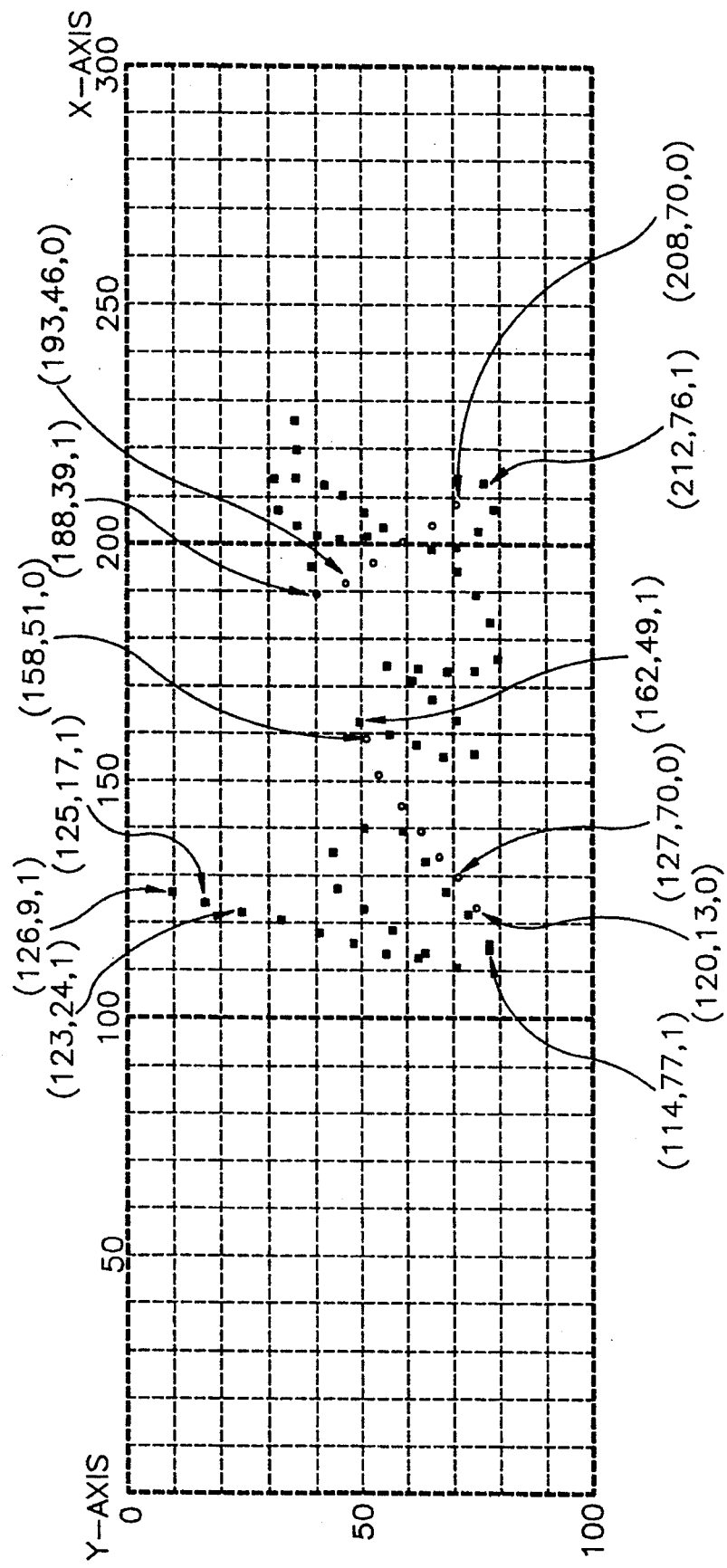

An example of a stroke drawn in the form of points on the tablet 101 by electronic pen 102 and the values corresponding to the points, i.e. sequences of X,Y coordinates, are shown in FIGS. 14A and 14B.

The stroke shows the constitution of a sequence of X,Y coordinates representative of characters drawn with electronic pen 102 on tablet 101. Referring to FIG. 14A, X,Y coordinate values representative of the word "but" drawn with pen 102 on tablet 101 are shown. Each set of X,Y coordinates includes a D value (i.e. the third value indicated in each set of coordinates), where the value of D is 1 when the stroke is an actually drawn stroke and the value of D is 0 when the stroke is an imaginary stroke. In FIG. 14A, all D values are 1 since each set of coordinates represents an actually drawn stroke.

TABLE 1

| X | Y | D | X | Y | D | X | Y | D | X | Y | D | X | Y | D |
|---|---|---|---|---|---|---|---|---|---|---|---|---|---|---|
| 126 | 9 | 1 | 125 | 14 | 1 | 124 | 20 | 1 | 123 | 23 | 1 | 122 | 27 | 1 |
| 121 | 31 | 1 | 120 | 35 | 1 | 119 | 39 | 1 | 118 | 43 | 1 | 116 | 47 | 1 |
| 115 | 51 | 1 | 114 | 54 | 1 | 113 | 61 | 1 | 112 | 66 | 1 | 111 | 69 | 1 |
| 110 | 72 | 1 | 111 | 68 | 1 | 113 | 64 | 1 | 115 | 60 | 1 | 118 | 56 | 1 |
| 121 | 52 | 1 | 125 | 48 | 1 | 127 | 45 | 1 | 130 | 44 | 1 | 134 | 43 | 1 |
| 137 | 43 | 1 | 138 | 46 | 1 | 139 | 49 | 1 | 139 | 53 | 1 | 139 | 56 | 1 |
| 138 | 59 | 1 | 137 | 62 | 1 | 135 | 66 | 1 | 132 | 69 | 1 | 129 | 71 | 1 |
| 126 | 74 | 1 | 122 | 76 | 1 | 119 | 77 | 1 | 116 | 77 | 1 | 114 | 77 | 1 |

The values of Table 1 are written into microprocessor 103 in the form of digital data and are processed in the manner depicted in the flow cart of FIG. 4.

It is well-known that microprocessor 103 enables the operation of tablet 101 by a program provided from ROM, a floppy disk driver (FDD) or a hard disk driver (HDD). Accordingly, the data created by contact between electronic pen 102 and tablet 101 can be easily read, as shown in Table 1 above.

To recognize words written in cursive with Roman characters (such as, for example, English language script) regardless of the style or quality of the users' handwriting, many people must first write the same letter on tablet 101 with electronic pen 102; HMM training can then be performed using those handwritten characters. For example, if approximately one hundred persons, selected regardless of sex and age, write the character "b", then each of those handwritten cursive characters can be converted into X–Y coordinates values and D values. In effect, this is a step of receiving values representative of characters and ligatures that the system is being trained to recognize. As an initial process, the letter "b" is written by each of those selected persons; alternatively, the word "but" can be written by those persons. In the present invention, however, the method of receiving strokes representative of a discrete letter, rather than a complete word, may be used. When every stroke of each character in the alphabet of a language under consideration is received, as described above, imaginary strokes are inserted between characters, i.e. between adjacent strokes, using the input values, and distances between adjacent points of the merged stroke, including any inserted imaginary stroke, are normalized according to a constant length. Then, the input data is converted into chain codes according to directional angles of vectors connecting adjacent points. The chain codes are then incorporated into corresponding HMMs (for ligatures and characters), and the result is recorded. When model training is complete, circular HMMs are constructed from the character and ligature models generated.

During character recognition, sequences of coordinates representative of a handwritten word to be recognized are received and imaginary strokes are inserted by the same method used in the training process. After the normalization operation, and conversion of the merged stroke into chain codes, the corresponding chain code sequence is then fed into the interconnected character and ligature HMMs to find a statistically optimal path, thereby recognizing the word. The result of the recognition process is then provided to a peripheral device, such as the display device 105.

Accordingly, in the present invention, the model training process and the recognition process may be performed separately.

MODEL TRAINING

Figure 4A:
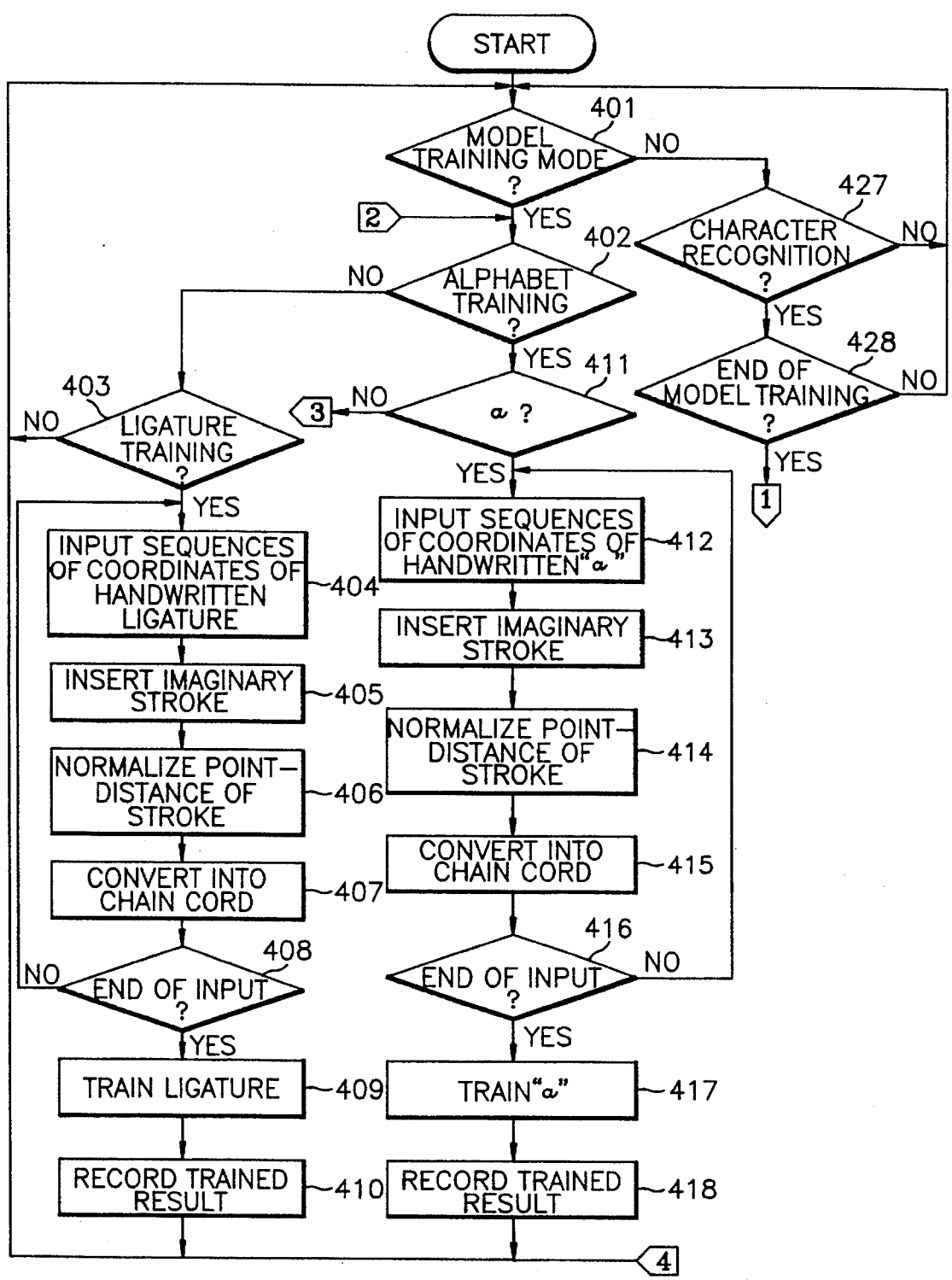
FIGS. 4A, 4B and 4C illustrate a flow chart showing, according to a training mode and a recognition mode performed according to the principles of the present invention, the training process as a preparation step for character recognition, and the recognition of an unknown character by forming circular HMMs after the training process has been completed.
Figure 4B:
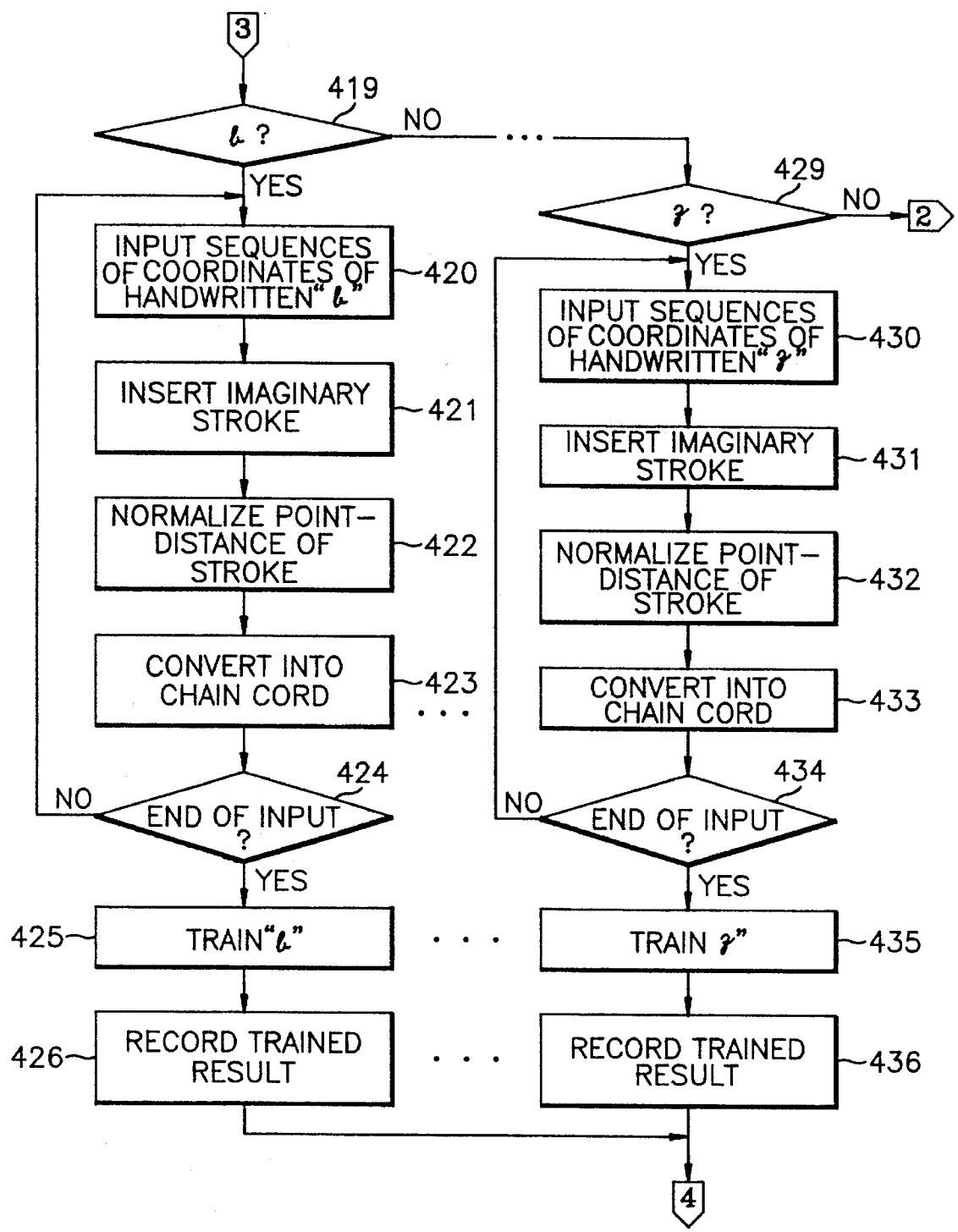
Figure 4C:
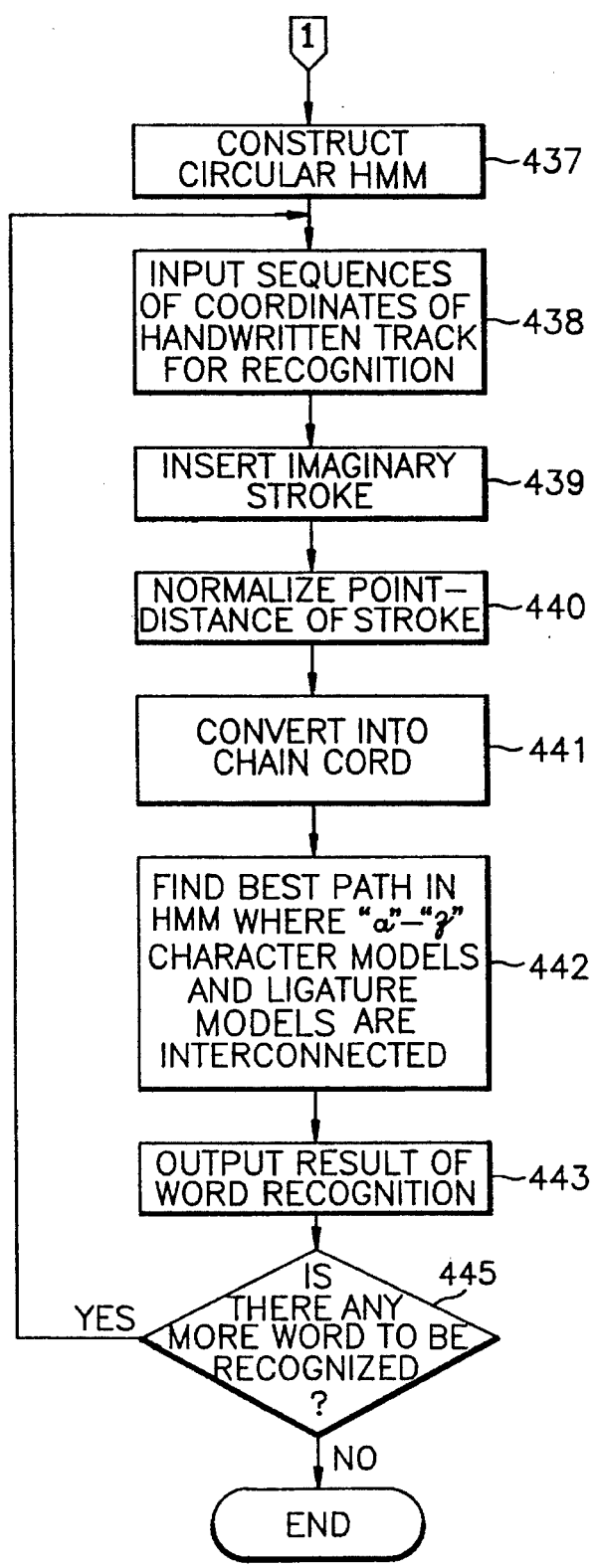

Referring now to FIGS. 4A through 4C, microprocessor 103 should first be placed in its model training mode by an outside command entered through a keyboard, at step 401. Since this example is for an English language word, an alphabet training mode is set at step 402, and the characters ("a" to "z") for which the system is being trained are selected at steps 411, 419 or 429. For example, when the character "b" is selected for system training, a model "b" is selected at step 419, "b" is written by electronic pen 102 on tablet 101, and the X,Y coordinate values and dot state values D corresponding to the handwritten "b" are read as shown in Table 1, at step 420.

An imaginary stroke (if any) for the letter "b" may then be inserted using the X,Y coordinate values and the dot state values D for "b", at step 421.

1. Insertion of Imaginary Stroke

The imaginary stroke inserted into the letter "b" at step 421 is processed according to the same principles as imaginary strokes inserted into ligatures, at step 405, and characters "a" and "z", at steps 413 and 431, respectively. A detailed description of the imaginary stroke processing step will be given in conjunction with the example of the English word "but" written in cursive on tablet 101, as shown in FIG. 14A, by referring to the flow chart of FIG. 5. Accordingly, even though the imaginary stroke insertion step for ligatures or characters "a" through "z" is not hereinafter described again, the processing of imaginary strokes for ligatures and all characters can be understood as being performed in the same way by reference to the earlier example using the single handwritten, cursive letter "b".

Figure 5:
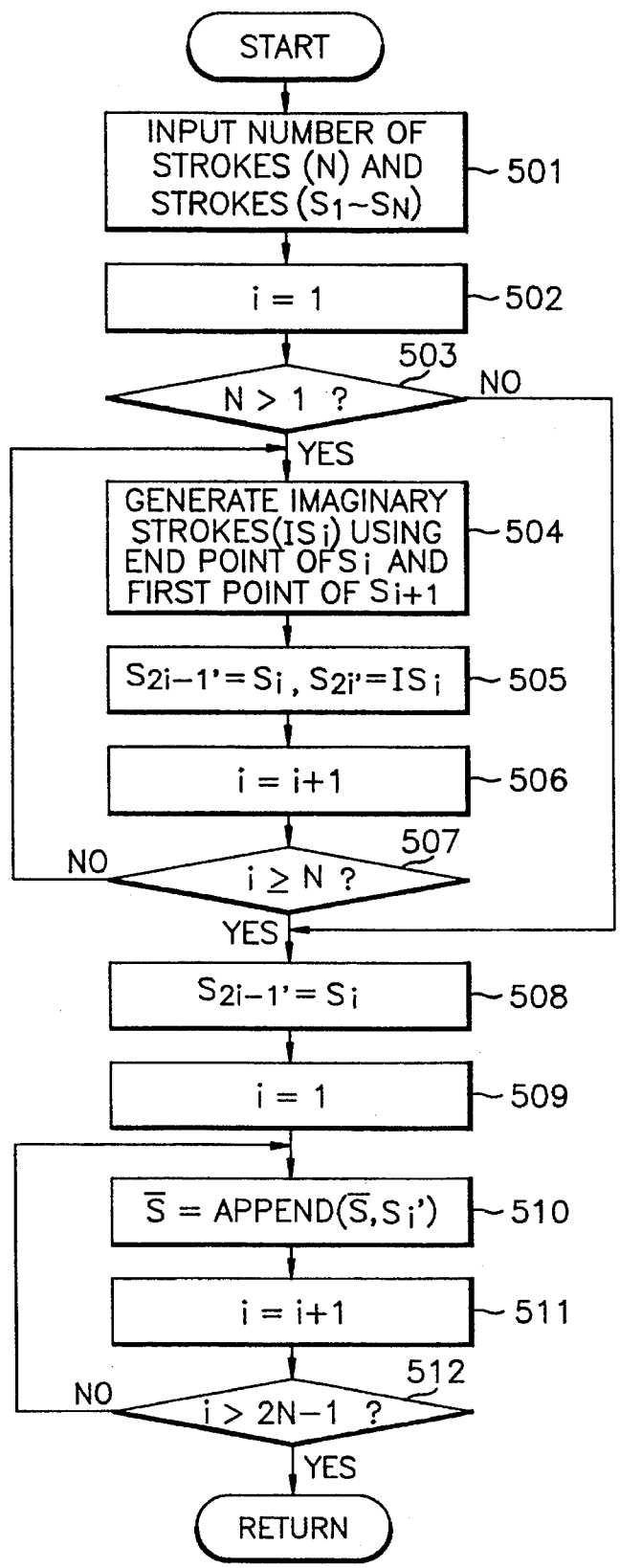
FIG. 5 is a flow chart showing the insertion of an imaginary stroke between virtual strokes of characters, as is applied to an embodiment constructed according to the principles of the present invention.

Referring to FIG. 5, steps 501 through 507 show an imaginary stroke insertion process while steps 508 through 512 show a merged stroke forming process.

The total number of strokes N and stroke values $S_1$ to $S_N$, which are to be processed and are related to the insertion of imaginary stroke, are input at step 501. In the example using the word "but" shown written in cursive style in FIG. 14A, the total number of strokes N is three, i.e. the word "but" has stroke components of "b", "ul", and "-". Information on the stroke values $S_1$ to $S_N$ is shown as values of X, Y and D in the following Tables 2, 3 and 4. Accordingly, these values are initially set.

TABLE 2

|     | X   | Y  | D | X   | Y  | D | X   | Y  | D | X   | Y  | D | X   | Y  | D |
| --- | --- | -- | - | --- | -- | - | --- | -- | - | --- | -- | - | --- | -- | - |
| "b" | 126 | 9  | 1 | 125 | 14 | 1 | 124 | 20 | 1 | 123 | 23 | 1 | 122 | 27 | 1 |
|     | 121 | 31 | 1 | 120 | 35 | 1 | 119 | 39 | 1 | 118 | 43 | 1 | 116 | 47 | 1 |
|     | 115 | 51 | 1 | 114 | 54 | 1 | 113 | 61 | 1 | 112 | 66 | 1 | 111 | 69 | 1 |
|     | 110 | 72 | 1 | 111 | 68 | 1 | 113 | 64 | 1 | 115 | 60 | 1 | 118 | 56 | 1 |
|     | 121 | 52 | 1 | 125 | 48 | 1 | 127 | 45 | 1 | 130 | 44 | 1 | 134 | 43 | 1 |
|     | 137 | 43 | 1 | 138 | 46 | 1 | 139 | 49 | 1 | 139 | 53 | 1 | 139 | 56 | 1 |
|     | 138 | 59 | 1 | 137 | 62 | 1 | 135 | 66 | 1 | 132 | 69 | 1 | 129 | 71 | 1 |
|     | 126 | 74 | 1 | 122 | 76 | 1 | 119 | 77 | 1 | 116 | 77 | 1 | 114 | 77 | 1 |

TABLE 3

|      | X   | Y  | D | X   | Y  | D | X   | Y  | D | X   | Y  | D | X   | Y  | D |
| ---- | --- | -- | - | --- | -- | - | --- | -- | - | --- | -- | - | --- | -- | - |
| "ul" | 162 | 49 | 1 | 160 | 54 | 1 | 158 | 59 | 1 | 156 | 63 | 1 | 155 | 68 | 1 |
|      | 154 | 71 | 1 | 154 | 74 | 1 | 157 | 75 | 1 | 160 | 73 | 1 | 163 | 70 | 1 |
|      | 167 | 66 | 1 | 170 | 62 | 1 | 171 | 59 | 1 | 174 | 56 | 1 | 175 | 53 | 1 |
|      | 175 | 57 | 1 | 174 | 61 | 1 | 173 | 65 | 1 | 171 | 69 | 1 | 172 | 73 | 1 |
|      | 172 | 76 | 1 | 173 | 79 | 1 | 176 | 79 | 1 | 179 | 79 | 1 | 182 | 78 | 1 |
|      | 187 | 76 | 1 | 191 | 73 | 1 | 196 | 69 | 1 | 198 | 66 | 1 | 200 | 63 | 1 |
|      | 203 | 59 | 1 | 204 | 55 | 1 | 206 | 51 | 1 | 110 | 43 | 1 | 211 | 40 | 1 |
|      | 212 | 37 | 1 | 213 | 34 | 1 | 213 | 30 | 1 | 213 | 27 | 1 | 214 | 24 | 1 |
|      | 211 | 26 | 1 | 206 | 34 | 1 | 205 | 37 | 1 | 204 | 40 | 1 | 202 | 44 | 1 |
|      | 201 | 47 | 1 | 200 | 51 | 1 | 200 | 55 | 1 | 199 | 59 | 1 | 199 | 62 | 1 |
|      | 199 | 65 | 1 | 199 | 69 | 1 | 200 | 73 | 1 | 202 | 76 | 1 | 205 | 79 | 1 |
|      | 208 | 79 | 1 | 211 | 78 | 1 | 212 | 76 | 1 |     |    |   |     |    |   |

TABLE 4

|     | X   | Y  | D | X   | Y  | D | X   | Y  | D | X   | Y  | D | X   | Y  | D |
| --- | --- | -- | - | --- | -- | - | --- | -- | - | --- | -- | - | --- | -- | - |
| "-" | 188 | 39 | 1 | 192 | 38 | 1 | 196 | 38 | 1 | 199 | 37 | 1 | 202 | 37 | 1 |
|     | 205 | 37 | 1 | 210 | 37 | 1 | 213 | 37 | 1 | 218 | 36 | 1 | 221 | 36 | 1 |
|     | 224 | 35 | 1 | 227 | 35 | 1 | 227 | 36 | 1 |     |    |   |     |    |   |

A loop index i for imaginary stroke insertion is set to an initial looping value at step 502, i.e. i=1, and the total number of actual strokes, N, is compared to the looping value at step 503. That is, since the number of actual strokes N is 3, it is larger in value than one. If it is not larger in value than one, however, there is no stroke to be processed; accordingly a jump to the step for merging the actual stokes and the imaginary stokes into one stroke may then be performed.

Accordingly, at step 503, since N has a value of three, N is larger in value than one. At step 504, an imaginary stroke value $IS_i$ is generated as $IS_i=\{(114,77,0),(162,49,0)\}$, from the final point (114,77,1) of the stroke values $S_i$ for the first stroke "b" (refer to Table 2), to the first point (162,49,1) of the stroke values $S_{i+1}$ for the second stroke "ul" (refer to Table 3).

To process the imaginary stroke (i.e. added stroke) and the actual strokes as a new stroke (i.e. the first actual stroke "b" and the second actual stroke "ul" supplemented with the addition of the imaginary stroke), the relationships $S_{2i-1}'=S_i$, and $S_{2i}'=IS_i$, are set and stored at step 505. After the imaginary stroke and actual strokes are stored as a new stroke at step 505, the loop index i is increased in value by one to a value of two at step 506. Accordingly, if N is less than three in value, another imaginary stroke is inserted at step 504. In the same way, to insert an imaginary stroke between the actual strokes "ul" and "-", an imaginary stroke is processed as $IS_{i+1}=\{(212,76,0),(188,39,0)\}$ using the final point (212,76,1) of the "ul" stroke and the first point (188,39,1) of the stroke "-". To process the imaginary stroke and the actual strokes as a new stroke, $S_{2i-1}'=S_i$ and $S_{2i}'=IS_i$ are set. Next at step 506, the loop index i is again increased in value by one, to a value of three.

Accordingly, since i corresponds to the number of strokes, namely three, the final value of the actual stroke "-" (shown in Table 4) is copied at step 508 (i.e. $S_{2i-1}'=S_i$). After this process, the respective strokes are formed as a new stroke including the total number of actual strokes, N=3. Next, to merge the respective new strokes including the imaginary strokes, the loop index i is assigned to a first loop (i.e. i=1) at step 509, and the process of combining the actual strokes and the imaginary strokes as a merged stroke is performed. That is, $$\bar{S}=\text{append}(\bar{S}, S_i')$$

to enable exact recognition of a word, even if the characters are separated within the word. Then, the loop index i for connecting a next stroke is increased in value by one (i.e. i=i+1) at step 511.

At step 512, the process is checked to determine whether all strokes are connected. In connecting the separated strokes as one stroke, the number of connected parts is reduced in value by one from the number of actual strokes, N. Thus, the loop i is compared with 2N−1, where N is the number of actual strokes. Accordingly, if i is not larger than 2N−1, step 510 is performed in order to connect the next stroke as one stroke, and if the current value of i is larger than 2N− 1, connection processing is performed to merge all of the strokes into one merged stroke.

That is, as described in the process above, for a cursive letter "b", an imaginary stroke generated according to the various shapes written by different people is inserted to make a new stroke at step 421 (see FIG. 4B). Here, in the merged stroke, the points of the actual strokes have D=1, and the points in the imaginary strokes have D=0. If the insertion of imaginary strokes is completed, a normalization step for making the distances between adjacent points of the merged strokes constant is performed at step 422.

2. Normalization of every distance between adjacent points of a stroke

Figure 6:
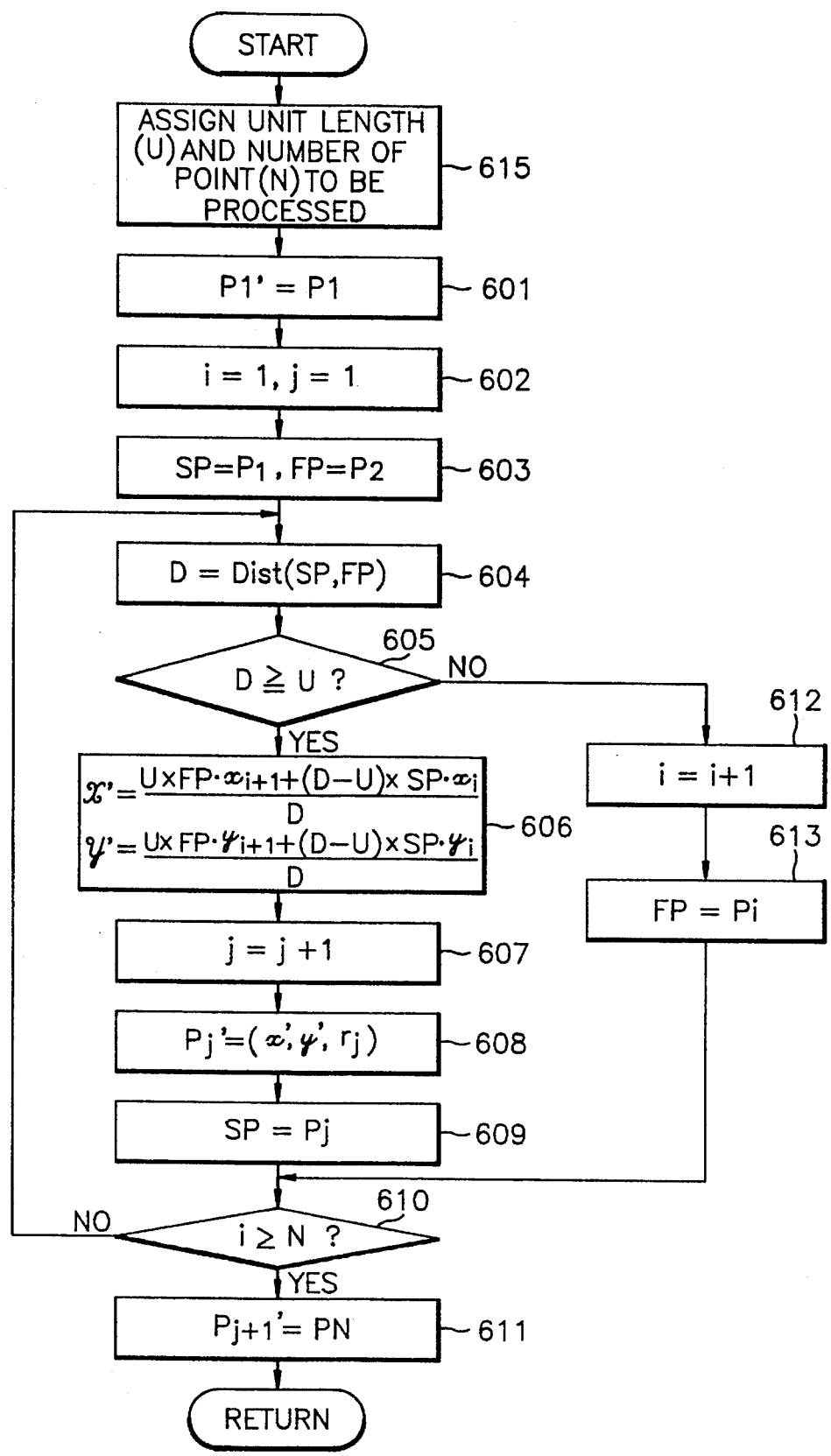
FIG. 6 is a flow chart showing the normalization of distances of adjacent points forming a merged stroke including the imaginary stroke, which is applied to an embodiment constructed according to the principles of the present invention.

Since the process of normalizing distances between adjacent points of a stroke at step 422 is the same as the process applicable to ligature and characters at steps 406, 414, and 432, those skilled in the art can easily understand the normalizing process with a single description referring to FIG. 6 and the merged stroke used in the example of FIG. 14B. To obtain normalized point-distance stroke values provided by S'={P1',..., PM'} from the merged input stroke values including imaginary strokes, $\bar{S}=\{P_1,\ldots,P_N\}$ (where N is the number of points) with $P_i=(x_i,y_i,r_i)$ (where r=0: imaginary point, r=1: actual point), a predetermined unit length U is assigned according to the size of written character at step 615, and the first value $P_1$ in the merged input stroke $\bar{S}$ including imaginary strokes is assigned (i.e., $P_1'=P_1$) at step 601. An index i for points to be normalized and an index j for normalized points are initiated at step 602.

A starting point $SP=(x_i,y_i)$ is assigned to $P_1$ and a next adjacent point $FP=(x_{i+1}, y_{i+1})$ is assigned to $P_2$, at step 603 to compare the current point with the next adjacent point. A distance D between the assigned points is calculated at step 604 (i.e. D=dist (SP,FP)). In step 605, the distance D calculated at step 604 is compared with the predetermined unit length U assigned at step 615.

If the calculated distance D is greater than or equal to the unit distance U, new points x' and y' are calculated at step 606 from start point $SP=(x_i,y_i)$ and final point $FP=(x_{i+1},y_{i+1})$ by the following equations:

$$x' = \frac{U \times FP \cdot x_{i+1} + (D-U) \times SP \cdot x_i}{D} \quad (2)$$

$$y' = \frac{U \times FP \cdot y_{i+1} + (D-U) \times SP \cdot y_i}{D} \quad (3)$$

A normalized point index j is increased by 1 (i.e. j=j+1) at step 607 to continuously keep track of the points to be normalized and maintain a status of the normalization process. Then, the newly generated point Pj' is assigned to a value of (x', y', $r_j$) at step 608, and the start point SP is replaced by the normalized point Pj' at step 609 (i.e., SP=Pj').

At step 610, the process is checked to determine whether the index i has reached a value equal to the total number of points, N, to be processed. At this time, if i is less than the total number of points N, the distance D is re-calculated at step 604. Then, if D is greater than or equal to the unit length U, steps 606 to 610 are repeated, and if D is not greater than or equal to the unit length U, the index i is increased in value by one (i.e. i=i+1) at step 612. The final point FP is set at step 613 to the point processed at step 612 to assign a final point FP for comparison with the previous start point SP. Then, at step 610 a determination is made as to whether the value of the index i is greater than or equal to N. Here, when the index i is less than the total number of points to be processed, N, the same process described above is repeated. That is, comparison between points is sequentially performed and new normalized points (x', y') having a constant distance are assigned to a value of $r_j$=1 for points of an actually drawn stroke and $r_j$=0 for points of an imaginary stroke. As a result of the determination made at step 610, when all points, N, to be processed are normalized with the same predetermined length, the final point of the merged stroke, including imaginary strokes, is processed as a normalized final point $P_{j+1}$ (i.e. $P_{j+1}=P_N$).

Referring to the example illustrated in FIG. 14A, the result of normalization after insertion of imaginary strokes is shown in Table 5 as follows.

TABLE 5

| X | Y | D | X | Y | D | X | Y | D | X | Y | D | X | Y | D |
|---|---|---|---|---|---|---|---|---|---|---|---|---|---|---|
| 126 | 9 | 1 | 125 | 17 | 1 | 123 | 24 | 1 | 121 | 32 | 1 | 119 | 40 | 1 |
| 116 | 47 | 1 | 114 | 55 | 1 | 113 | 63 | 1 | 111 | 70 | 1 | 113 | 63 | 1 |
| 117 | 57 | 1 | 122 | 51 | 1 | 128 | 45 | 1 | 135 | 43 | 1 | 139 | 50 | 1 |
| 138 | 58 | 1 | 135 | 65 | 1 | 129 | 71 | 1 | 123 | 75 | 1 | 116 | 77 | 1 |
| 114 | 77 | 1 | 120 | 73 | 0 | 127 | 70 | 0 | 133 | 66 | 0 | 130 | 60 | 1 |
| 146 | 59 | 0 | 152 | 55 | 0 | 158 | 51 | 0 | 162 | 49 | 1 | 159 | 58 | 0 |
| 155 | 66 | 1 | 155 | 74 | 1 | 163 | 70 | 1 | 169 | 63 | 1 | 174 | 56 | 1 |
| 173 | 64 | 1 | 172 | 73 | 1 | 176 | 79 | 1 | 185 | 77 | 1 | 193 | 72 | 1 |
| 199 | 65 | 1 | 204 | 57 | 1 | 207 | 48 | 1 | 211 | 40 | 1 | 213 | 31 | 1 |
| 206 | 35 | 1 | 202 | 43 | 1 | 200 | 52 | 1 | 199 | 61 | 1 | 199 | 71 | 1 |
| 204 | 78 | 1 | 212 | 76 | 1 | 208 | 70 | 0 | 204 | 64 | 0 | 200 | 58 | 0 |
| 196 | 52 | 0 | 193 | 46 | 0 | 188 | 39 | 1 | 195 | 38 | 1 | 202 | 37 | 1 |
| 210 | 37 | 1 | 217 | 36 | 1 | 224 | 35 | 1 | | | | | | |

This result can be redrawn as illustrated in FIG. 14B.

If normalization of distances of adjacent points of the stroke is completed, conversion of the normalized distances of adjacent points into chain codes is performed at steps 407, 415, 423 or 433 of FIGS. 4A and 4B.

3. Chain Code Conversion

Figure 2:
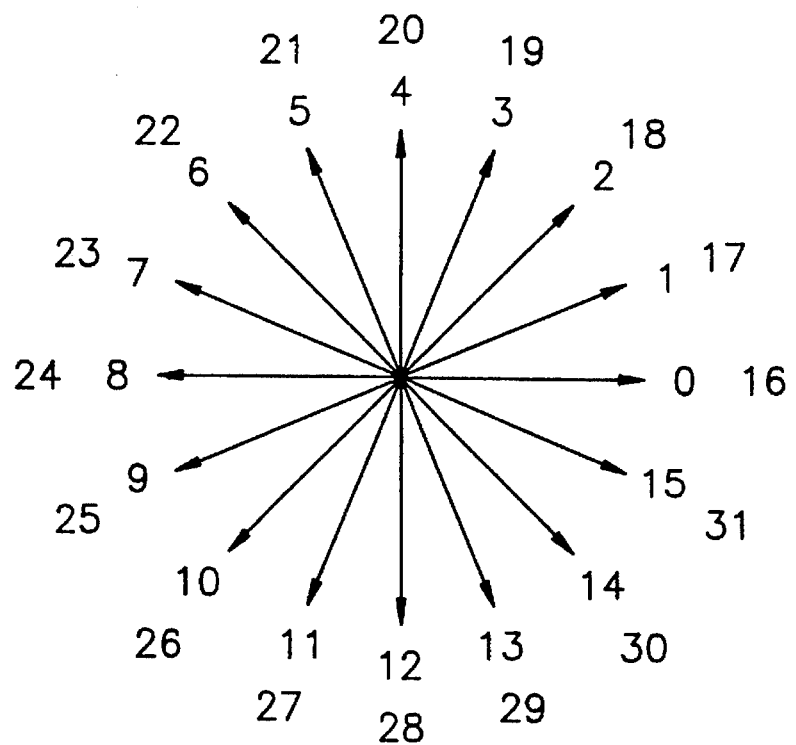
FIG. 2 illustrates a directional angle of vectors connecting adjacent points according to the principles of the present invention.
Figure 7:
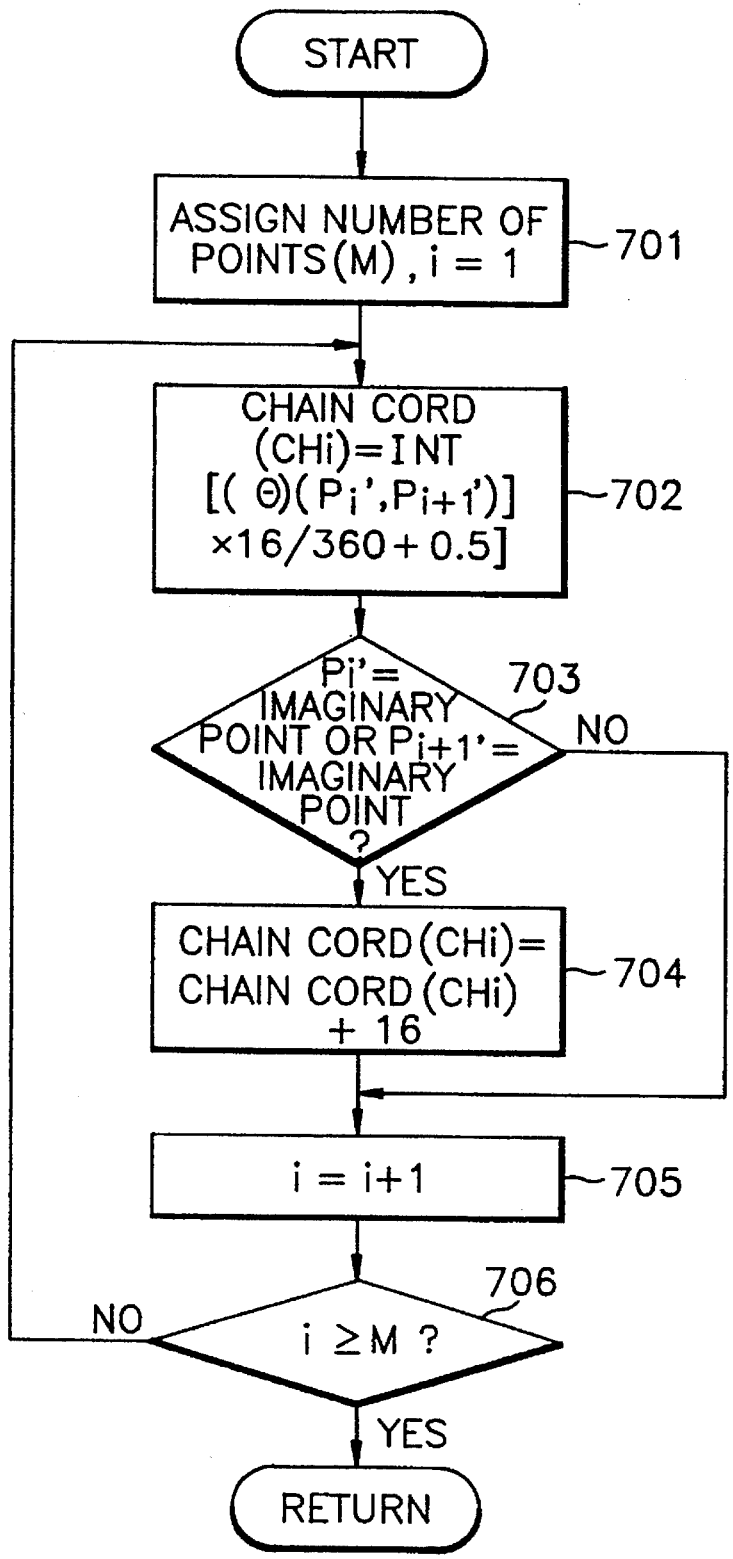
FIG. 7 is a flow chart showing the generation of the chain codes according to directional angles of vectors connecting adjacent points which are normalized in FIG. 6.

The chain code conversion process at each of the steps 407, 415, 424, and 434 is the same, and those steps are hereinafter described with reference to FIGS. 2 and 7. In FIG. 2, chain codes 0 to 15 are for points of an actual stroke and chain codes 16 to 31 are for points of an imaginary stroke.

An initial index i to return to the original point from the points normalized in the above process, (i.e. $S'=(P_1', \ldots, P_M'))$ for M number of points, is set to a value of one at step 701. At step 702, the normalized values are converted into chain codes CHi according to the directional angles of vectors connecting adjacent points by the principle of the following equation (4). INT in equation (4) has only integer values, and the addition of 0.5 is simply to obtain a rounded up value.

$$CHi = INT[angle(\theta)(P_i, P_{i+1}') \times (^{16}\!/_{360}) + 0.5] \qquad (4)$$

The angle between a first point $P_i'=(126,9,1)$ and a second point $P_{i+1}=(125,17,1)$ in Table 5 corresponding to the exemplary word as shown redrawn in FIG. 14B, is about 262.87°, which is multiplied by the factor $^{16}\!/_{360}$ and then is added to 0.5. Accordingly, a value of about 12.18 is obtained, which is converted into an integer "12". Consequently, the chain code is "12" as shown in FIG. 2. At step 703, a determination is made whether $P_i'$ or $P_{i+1}'$ is an imaginary point. If neither is an imaginary point, the index i is increased by 1 at step 705. Then, at step 706, a determination is made as to whether the point number index i has reached a value greater than or equal to the total number M. If the current value of the point index i is not greater than or equal to the total number M, then, at step 702, another angle between the next points $P_{i+1}'=(125,17,1)$ and $P_{i+2}'=(123,24,1)$ is calculated to be about 245.05°. This value is multiplied by $^{16}\!/_{360}$ and added to 0.5, thereby achieving a value of about 11.79°, which is converted into an integer value of 11. Thus, the chain code CHi is "11".

By such steps, chain codes CHi can be generated from directional angles for all of the connected adjacent points shown in Table 5.

Meanwhile, if an imaginary point is determined to exist at step 703, a chain code for an imaginary stroke is generated at step 704. That is, the chain code CHi obtained at step 702 is added to 16, so that the chain code CHi for the imaginary stroke is obtained. If the index i becomes equal to or greater than the total number of points M by iteration of the above process steps 702 through 705, the chain code conversion process is completed. The numerical values contained in the following Table 6 show chain codes obtained from FIG. 14B.

TABLE 6

| 12 | 11 | 11 | 11 | 11 |
|----|----|----|----|----|
| 11 | 12 | 11 | 3  | 3  |
| 2  | 2  | 1  | 13 | 12 |
| 11 | 10 | 10 | 9  | 8  |
| 17 | 17 | 17 | 17 | 17 |
| 17 | 17 | 17 | 11 | 11 |
| 12 | 1  | 2  | 2  | 12 |
| 12 | 14 | 1  | 2  | 2  |
| 3  | 3  | 3  | 3  | 9  |
| 11 | 11 | 12 | 12 | 13 |
| 1  | 21 | 21 | 21 | 21 |
| 21 | 21 | 0  | 0  | 0  |
| 0  | 0  |    |    |    |

As each chain code conversion is determined to be complete, at steps 408, 416, 424 or 434 a check is made of whether input of training data collected for ligature and characters has been completed. There are several methods for collecting character data to train the system. For example, data in units of characters, or data in units of words divided into characters, may be collected. In the embodiment of the present invention, the example of collecting data according to the unit of character is used. In collecting ligatures to train the system, ligature parts are extracted manually and then are read as input data.

If each input step is completed, ligature HMMs are trained at step 409 and the respective character HMMs are trained at steps 417, 425 and 435.

4. Training of Hidden Markov Models

Each HMM used in the practice of the present invention basically has a plurality of nodes, arcs, and null-arcs, as represented in FIG. 3. A character model structure which is one preferred embodiment of the present invention is composed of ten nodes, eighteen arcs and nine null-arcs, as shown in 801 to 803 of FIG. 8. Here, transitions to the same node and the next node are permitted, except with the final node. Whenever a transition is generated, one of chain codes shown in Table 6 is consumed. Transition in a null-arc can be made, however, without consuming a chain code.

Figure 8:
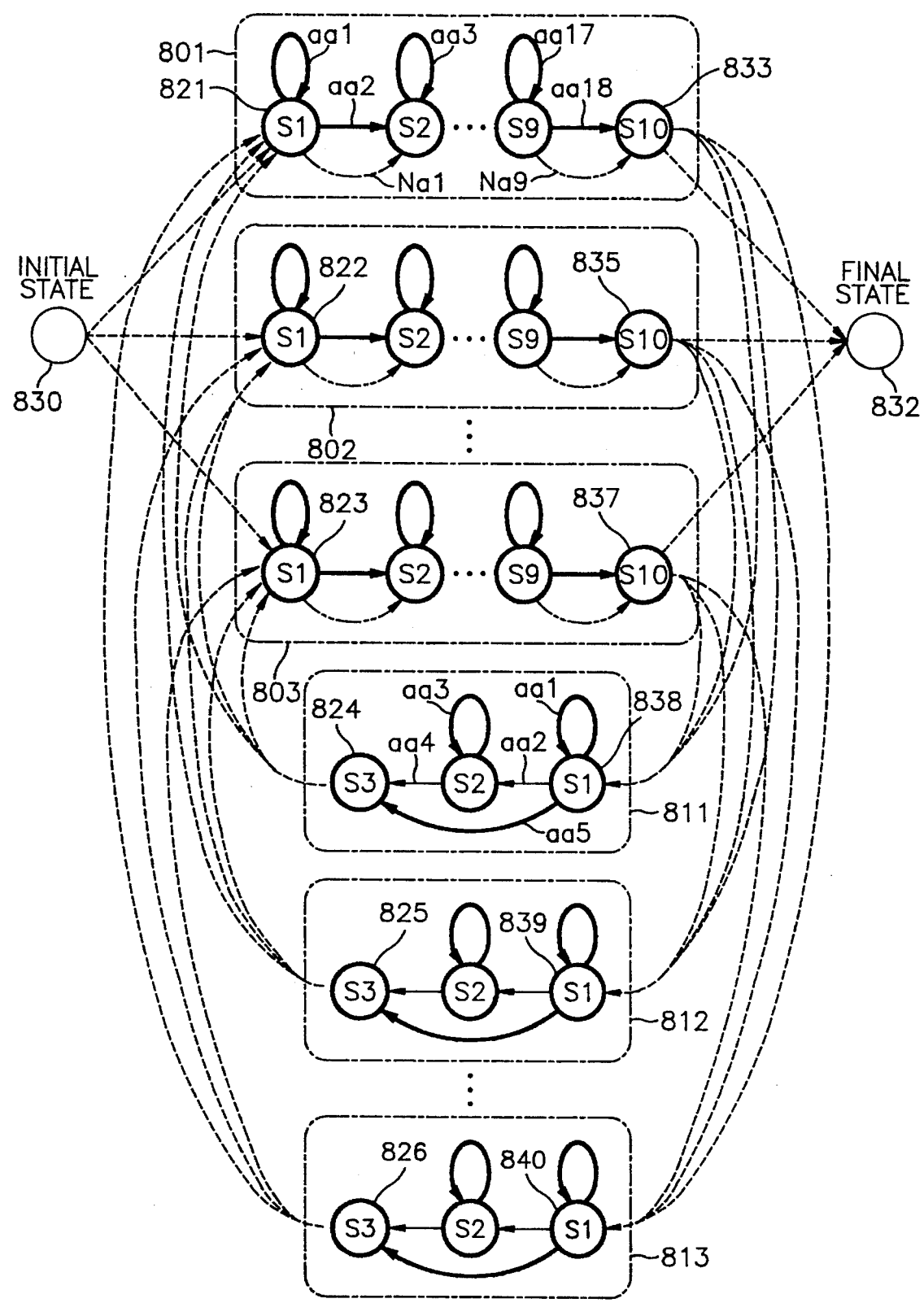
FIG. 8 is a diagram of circular HMMs formed by connecting character models and ligature models in a recognition mode after training of ligature HMMs and character HMMs has been completed.

In the structure of ligature models, each model is composed of three nodes S1, S2 and S3, and five arcs (e.g. arcs "aa1" through "aa5" in 811), as shown in 811 to 813 of FIG. 8. In contrast to the character models, these ligature models have no null-arcs.

The converted chain codes of characters and ligatures are represented in trained HMM models. In this training, transition probability and output probability are calculated using the following equations (6) and (7). Here, some notations and definitions used in equations (6) and (7) are as follows:

S: number of nodes $A=\{a_{ij}=P(q_k)\}$: transition probability distribution $B=\{b_{ij}(y_k)=P(y_k|q_1)\}$: output probability distribution x: sequence of transitions y: sequence of training data k: length of y q: a transition, i.e. either an arc or a null-arc $\Omega(s)$: {q such that origin(q)=s}

$$\alpha(s,i) = P(y_{ij}, debt(x_i) = s) \qquad (5)$$
$(dest(x_i)$ : a denstination node of transition $x_i)$
$$\beta(s,i) = P(y_{i+1,k}, |origin(x_i) = s) \qquad (6)$$
$(origin(xi)$ : an origin node of transition $x_i)$
$$\gamma(q,i) = \alpha(origin(q), i-1) P(q|origin(q))P(y_i|q) \qquad (7)$$
$\beta(dest(q),i),$
where q is an arc
$$\gamma(q,i) = \alpha(origin(q),i)P(q|origin(q))\beta debt(q),i), \qquad (8)$$
where q is a null-arc M: number of training data in each model.

The $\alpha(s,i)$ in equation (5) and $\beta(s,i)$ in equation (6) are obtained by the following two algorithms. In the following algorithms, m(s) is the set of arcs to a node s, and n(s) is the set of null-arcs to a node s. P(q) is a probability of generating arc or null-arc q, $P(y_i|q)$ is a probability of observing output symbol $y_i$ when a transition q is generated. Also, mb(s) is the set of arcs from a node s, and nb(s) is the set of null-arcs from a node s. The total number of nodes is S, and the number of output symbols is K. In the following equations (9) and (10), Pm is the probability of m-th training data for the HMM, and is equal to the value of $\alpha(S,K)$ for m-th training data (refer to equation (11)). After obtaining the values of $\alpha$ and $\beta$, the value $\gamma$ is obtained using equations (7) and (8). In the following equations (9) and (10), $\gamma m$ is the value $\gamma$ of m-th training data. In equation (9), $\Sigma i : y_{mi} = j$ in the numerator makes a calculation only if $y_{mi} = j$ is satisfied in calculating the sum of i, where $y_{mi}$ is the i-th symbol data for m-th training data.

(a) Algorithm 1: Calculation of $\alpha(s, i)$

All the s, i.e., S nodes, are topologically sorted so that the destination of every null-arc is greater than the origin.

```
α(inital state, 0)← 1
α(any other state, 0)← 1
for i ← 0 to K do
    for s ← 1 to S do
        α(s,i) ← 0
        for q in m(s) do
            if i>0 then do
                α(s,i) ← α(s,i) + α(origin(q), i − 1) * P(q) *
                P(y_i|q)
            end
        end
        for q in n(s) do
            α(s,i) ← α(s,i) + α(origin(q),i) * P(q)
        end
    end
end
```

(b) Algorithm 2: Calculation of β(s, i)

All the nodes, i.e., S nodes, are topologically sorted so that the destination of every null-arc is greater than the origin.

```
β(final state, K)← 1
β(any other state, K)← 1
for i ← K to 0 by −1 do
    for s ← S to 1 by −1 do
        β(s,i) ← 0
        for q in mb(s) do
            if i < K then do
                β(s,i) ← β(s,i) + β(dest(q), i + 1) * P(q) *
                P(y_{i+1}|q)
            end
        end
        for q in nb(s) do
            β(s,i) ← β(s,i) + β(dest(q),i) * P(q)
        end
    end
end
```

Output probability: probability of j-th symbol in arc q, $$\hat{p}(j|q) = \frac{\sum_{m=1}^{M} \frac{1}{P_m} \sum_{i:y_{mi}=j} \gamma_m(q,i)}{\sum_{m=1}^{M} \frac{1}{P_m} \sum_{i=1}^{K_m} \gamma_m(q,i)} \quad (9)$$

Transition probability: probability of arc or null-arc r occurring from node s $$\hat{p}(r|s) = \frac{\sum_{m=1}^{M} \frac{1}{P_m} \sum_{i=1}^{K_m} \gamma_m(r,i)}{\sum_{m=1}^{M} \frac{1}{P_m} \sum_{q \in \Omega(s)} \sum_{i=1}^{K_m} \gamma_m(q,i)} \quad (10)$$

According to the principle of HMM training in FIGS. 4A and 4B, character training occurs at steps 417, 425 and 435 and ligatures training occurs at step 409. If training is complete at the respective steps 409, 417, 425 and 435, the training result of each model is recorded temporarily in the RAM of the memory 104. In this state, since microprocessor 103 is assigned to a recognition mode by an outside command, mode determinations are made at steps 401 and 427. If the mode is not determined to be a training mode at step 401, but rather a recognition mode at step 427, the completion of HMM training at steps 409, 417, 425 and 435 is checked at step 428. If the HMM training is complete, circular HMMs for the respective trained models are constructed at step 437, as is shown in FIG. 8. The circular HMMs have a global initial state 830 and a global final state 832. The global initial state 830 is connected to the respective first nodes of character models 801 to 803 through null-arcs, and the respective final nodes of character models (characters "a" through "z") 801 to 803 are connected to the global final state 832 through null-arcs. Also, null-arcs are connected between the respective ligature models 811 to 813 and character models 801 to 803. The probabilities of null-arcs outside of character models 801 to 803 and ligature models 811 to 813 are assigned such that the sum of probabilities of all null-arcs from the respective nodes becomes one in value.

Figure 9:
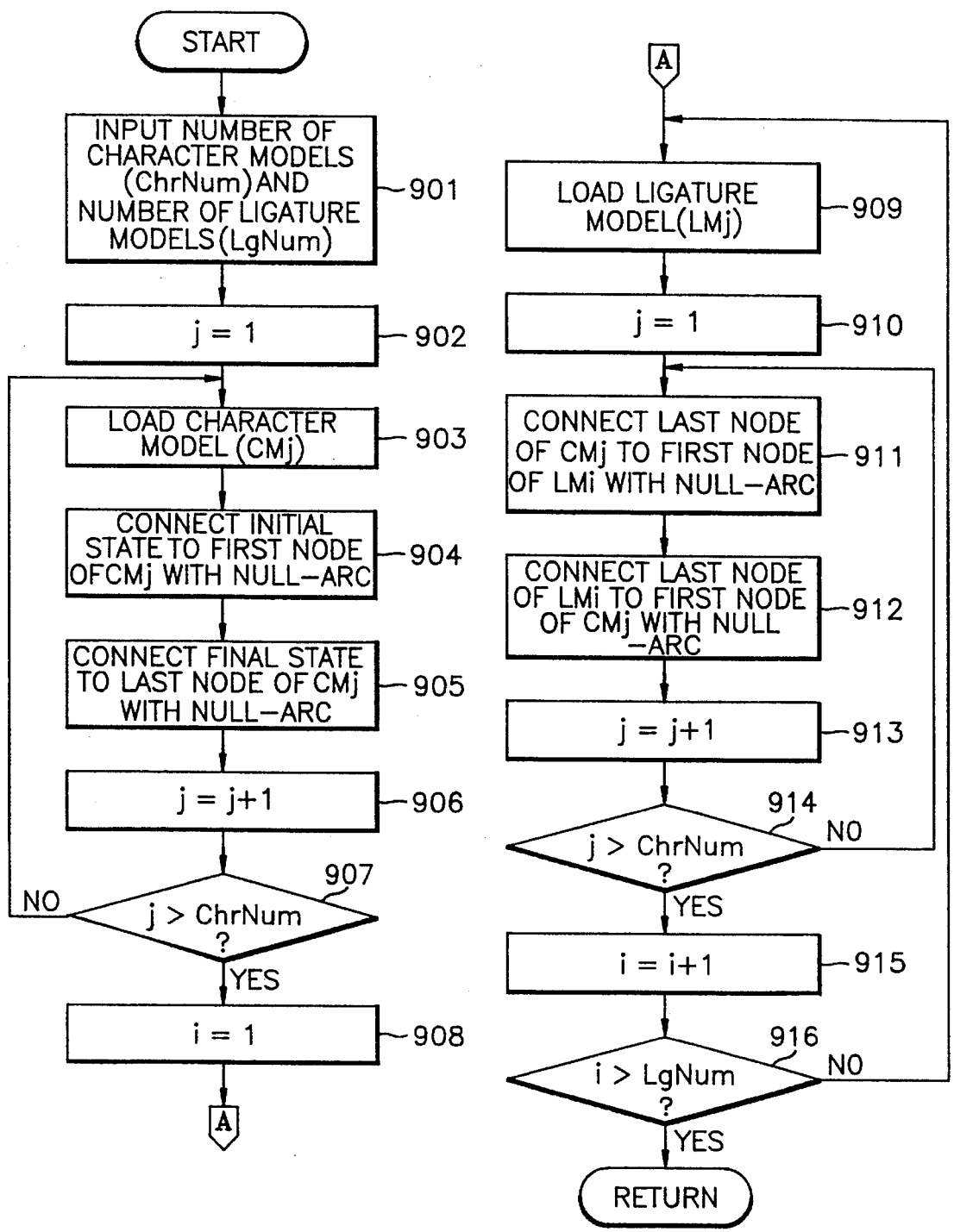
FIG. 9 is a flow chart showing the connection of character HMMs and ligature HMMs as shown in FIG. 8, according to an embodiment constructed according to the principles of the present invention.

The embodiment of constructing the circular HMMs as shown in FIG. 8, at step 437 of FIG. 4C can be understood in detail by those skilled in the art by referring to FIG. 9. The number of trained character models 801 to 803, i.e. Chr Num, and the number of trained ligature models 811 to 813, i.e. Lg Num, are input at step 901. An index j, for character models 801 to 803 in the HMMs to be constructed, is initiated to a value of one at step 902. A character model CMj, one of the character "a" to "z" models 801 to 803, is loaded at step 903 and its first node is connected to the global initial state IS 830 with a null-arc at step 904. The final node of the character model CMj is connected to the global final state FS 832 with null-arc at step 905. The index j is incremented in value by one for the next character HMM to be connected at step 906, and the current value of the index is checked to determine whether it is larger than the number of input character models Chr Num at step 907. If the index j is not larger than the number of character models Chr Num, steps 903 to 906 are again performed for connection between HMMs with null-arcs. For connection of ligature models, an index i is assigned to an initial value of one at step 908. A ligature model LMi, one of ligature models 811 to 813, is loaded at step 909 and an index j for connection to the first nodes of the character models 801 to 803 is assigned to an initial value of one at step 910. The first node 838 of the ligature model LMi 811 is connected to the global final state 833 of the character model CMj 801 with a null-arc at step 911, and the final node 824 of the ligature model LMi 811 is connected to the first node 821 of the character model CMj 801 with a null-arc at step 912. In repeating the same steps, the index j for character models is incremented by a value of one according to the number of character models 801 to 803 at step 913, and the steps are repeated while the index j is not larger than the total number of character models Chr Num at step 914. Then, the index i for ligature models is sequentially incremented in value by one according to the number of ligature models 811 to 813 at step 915, and the connection of ligature models is repeated while the index i is not larger than the number of ligature models Lg Num at step 916, thereby completing the construction as shown in FIG. 8. If the training of every model is complete and the probabilities of null-arcs outside of the models are assigned as described above, the unknown cursive character or word is received to be recognized.

RECOGNITION PROCESS

It has been noted that for recognition of unknown cursive characters or words, the circular HMMs composed of trained ligature and character models as shown in FIG. 8 should be stored in the memory 104 and the microprocessor 103 should be in a character recognition mode. Accordingly, when microprocessor 103 is ready for characters or a word, the output composed of the coordinate X,Y values and the states of stroke-forming points D (refer to Table 1), i.e. the values of the track written, as shown in FIG. 14A, such as an English language character or word written with electronic pen 102 upon tablet 101, are received and processed in microprocessor 103, and then are stored in RAM 104. At step 439, an imaginary stroke is inserted using stroke values in the same order as the steps of FIG. 5 used in the model training step. If the imaginary stroke is inserted at step 439, every distance between adjacent points of the stroke is normalized at step 440, by the same method as illustrated in FIG. 6 for model training, such that every distance between adjacent points constituting a merged stroke, including the imaginary strokes, is the same. At step 441, the directional angles of vectors connecting each point of the stroke normalized at step 440 to an adjacent point is convened into one of the chain codes 0 to 31 shown in FIG. 2, according to the flow chart of FIG. 7 used in the model training. At this time, the chain codes 0 to 15 are provided for actual or real strokes, and the chain codes 16 to 31 are provided for additionally inserted imaginary strokes. If the chain code conversion for an unknown English word or character to be recognized is completed by the above process, the chain codes are input, at step 442, into the circular HMMs constructed at step 437, as shown in FIG. 8. The unknown English word or character input is recognized by finding an optimal path from the global initial state 830 to the global final state 832 from the sequence of obtained chain codes. Step 442 of finding an optimal path in the interconnected character and ligature HMMs constructed as shown in FIG. 8, is described with reference to FIGS. 10 to 12.

1. Selection of optimal path

Figure 11:
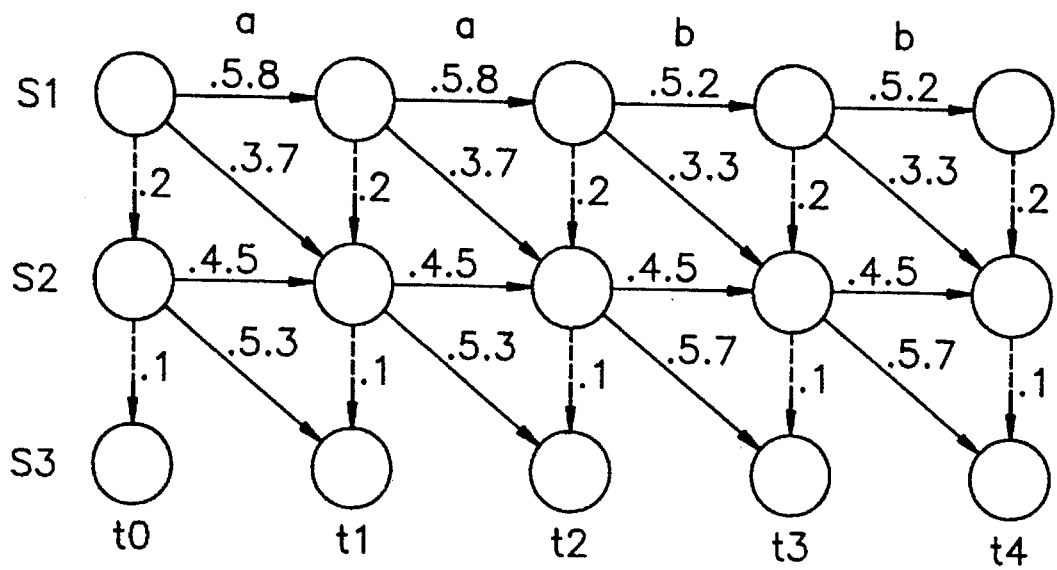
FIG. 11 is a lattice structure for describing the search for the best path, according to an embodiment constructed according to the principles of the present invention.

When an optimal path is searched for in the circular character and ligature HMMs shown in FIG. 8, sequences of characters making no word are eliminated with reference to the word dictionary in ROM of the memory 104. FIG. 11 is an example showing a lattice structure for finding the best path when an output symbol "aabb" is observed in the HMMs of FIG. 3. It is noted that this example is used only for understanding of best path searching step.

Figure 12:
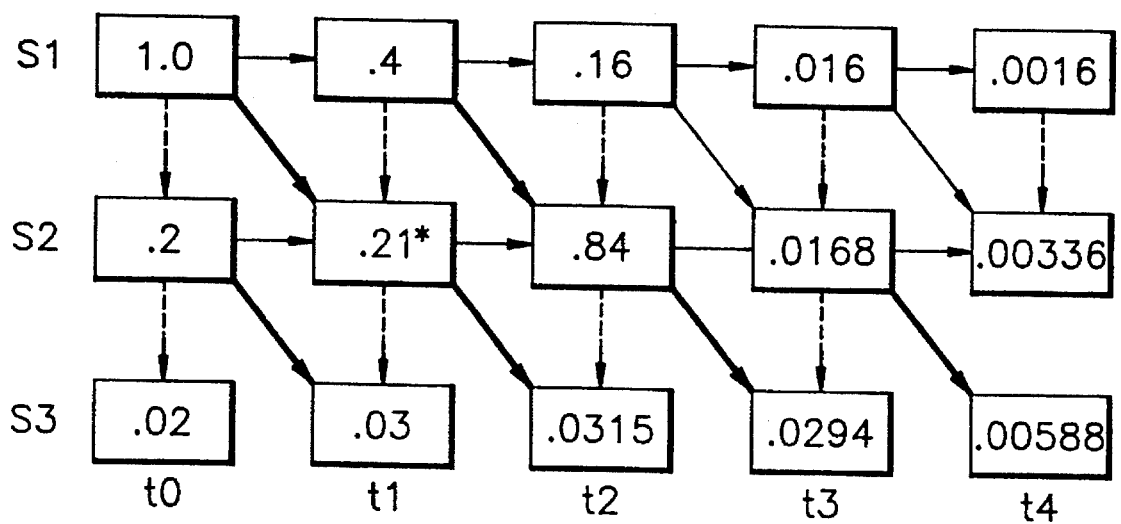
FIG. 12 shows the search for the best path and the probabilities, which will be applied in an embodiment constructed according to the principles of the present invention.

Referring to FIGS. 11 and 12 showing the process of calculating the best path, the path of observing "aabb" from a start node S1 to a final node S3 can be determined. The best path is followed backwards with the solid arrow from the node S3 to the node S1. Accordingly, in this example, the optimal path is S1→S2→S2→S2→S3. The value of 0.21* is a maximum value of the following probabilities:

$$0.21^* = MAX\{(1.0)^* \ 0.3.7, (0.4)^* 0.2, (0.2)^* \ 0.4.5\} \quad (12)$$

EXAMPLE I

The values shown along the paths of the lattice structure in FIG. 11 are illustrated as:

(1) At .a.b(0.3.7), as a value on the path (non-null transition) indicated by a solid line, a transition probability becomes 0.a(0.3) and a symbol output probability becomes 0.b(0.7).

(2) At .a(0.2), as a value on the path (null transition) indicated by a dotted line, the transition probability becomes 0.2. The null transition means a process of passing through a path without multiplying the probability of a candidate by the symbol output probability.

(3) The foregoing described paragraphs (1) and (2) are based on the principles of hidden Markov models.

EXAMPLE II

The following example of equation (12) illustrates a process of calculating the best path at (S2, t1) in the mode illustrated in FIG. 12:

$$21^* = MAX \left\{ \underbrace{(1.0)^*.3.7}_{<1>}, \underbrace{(0.4)^*.2}_{<2>}, \underbrace{(0.2)^*.4.5}_{<3>} \right\} \quad (12)$$

(1.0) * 0.3.7 of the above <1> is generated from (S1, t0), (0.4) * 0.2 of the above <2> is generated from (S1, t1), and (0.2) * 0.4.5 of the above <3> is generated from (S2, t0).

The Viterbi algorithm is used as a method of finding the best path in the present invention. The Viterbi algorithm is disclosed in detail in U.S. Pat. No. 4,583,078 entitled *Serial Veterbi Decoder* issued to Shenoy. Accordingly, a detailed description of the Viterbi algorithm, except for the following description will be omitted. The Viterbi algorithm applied to the present invention is as follows:

Algorithm 3: Search of best path (Viterbi algorithm)

All of the nodes, i.e. eight nodes, are topologically sorted so that the destination of every null-arc is greater than the origin.

```
input: Y = y₁, y₂, y₃, . . ., yₖ, output symbol sequence
output: Q, best path from the inital node to the final node
F(inital state, 0) ← 1.0
F(any other state, 0) ← 0.0
for i ← 0 to K do
    for s ← 1 to S do
        for q in n(s) do
            prob ← F(origin(q),i) * P(q)
            if prob > F(s,i) then do
                F(s,i) ← prob
                Q(s,i) ← Q(origin(q), i) append q
            end
        end
        for q in m(s) do
            if i > 0 then do
                prob ← F(origin(q), i–1) * P(q) * P(yᵢ/q)
                if prob > F(s, i) then do
                    F(s, i) ← prob
                    Q(s, i) ← Q(origin(q), i–1) append q
                end
            end
        end
    end
end
```

Figure 10A:
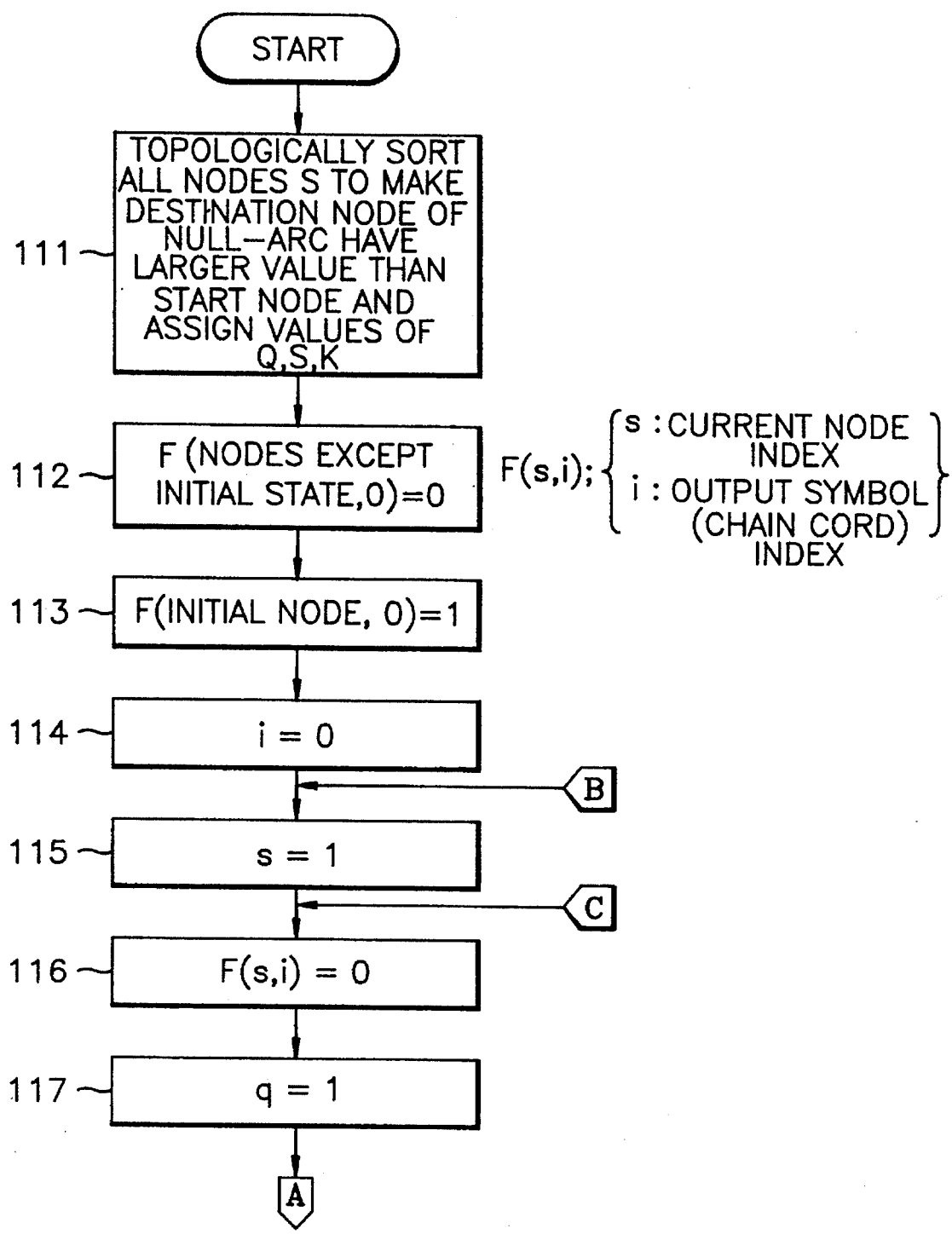
FIGS. 10A AND 10B illustrate a flow chart showing the search for the best path within a time proportional to the number of output symbols (chain codes) in the construction of FIG. 8 in a recognition process, according to an embodiment constructed according to the principles of the present invention.
Figure 10B:
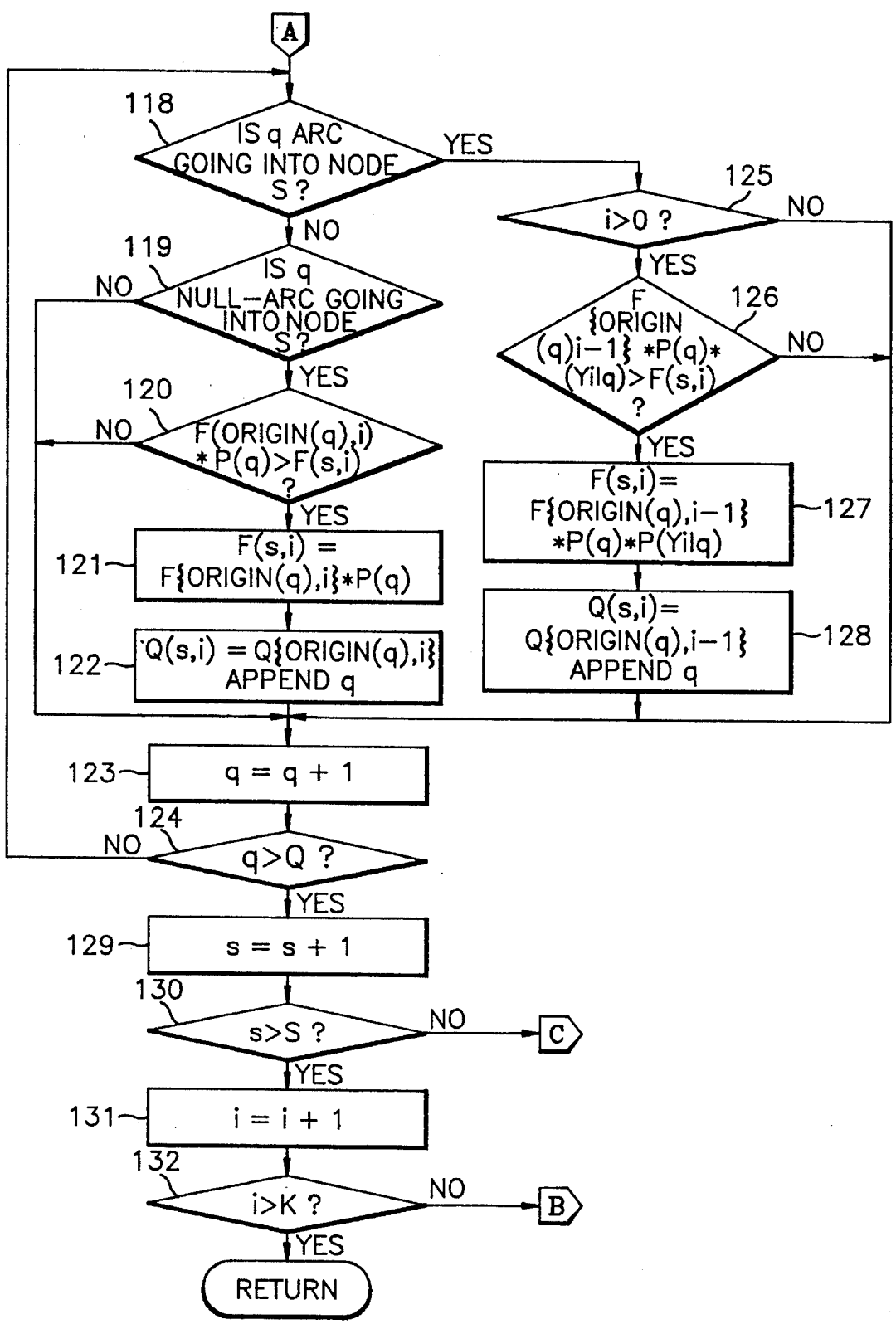

The Viberti algorithm for finding the best path in the circular HMMs of FIG. 8 is now described in detail with reference to FIGS. 10A and 10B.

All of the nodes S are topologically sorted so that the destination of every null-arc is greater than the origin, at step 111, and F (any other node except initial state, 0) is set to a value of 0 at step 112 and F (initial state, 0) is set to 1 at step 113.

The output symbol (chain code) index i and the node index s are initially set to i=0 and s=1 at steps 114 and 115, respectively, and the probability F(s, i) of observing i output symbols (chain codes) and being in a current node s is initiated to 0 at step 116.

An arc index q is assigned to a first arc, 1, at step 117, and it is determined at step 118 whether the arc q is an arc to a node s. When the arc q is an arc to the node s at step 118, it is determined at step 125 whether the output symbol index i is greater than 0. When the arc q is not the arc to node s at step 118, it is determined at step 119 whether the arc q is a null-arc to node s.

If the arc q is a null-arc to node s at step 119, the probability of observing i output symbols and being in an origin node (origin(q)) of the null-arc and the probability P(q) of the null-arc occurring are multiplied, i.e. F(origin(q), i) * P(q). The multiplied value is checked at step 120 to be greater than the probability F(s,i) of observing i output symbols (chain codes) and being in the current node s. If the value is larger than F(s,i) at step 120, F{origin(q),i} x p(q) is selected as F(s,i) at step 121. The best path Q{origin(q),i} of the origin node origin(q) of the arc q when i output symbols are observed is added with a current optimal path of the null-arc q, i.e. Q(s,i)=Q(origin(q),i) append q.

If the output symbol index i is greater than 0 at step 125, the probability of occurrence of origin arc, origin(q), indicating the origin node of the arc and the probability P(q) of occurrence of the same arc q, are multiplied. The multiplied result is again multiplied by a probability $P(y_i|q)$ of generating the i-th output symbol (chain code) $y_i$ when the arc q is generated. Then, it is determined whether the calculated value $F(origin(q), i-1) * P(q) * P(y_i|q)$ is greater than the probability F(s, i) of observing i output symbols (chain codes) and being in current node s. If F(s, i) is greater, it is assigned to $F\{origin(q), i-1\}* P(q) * P(y_i|q)$ at step 127, and Q(s, i) is determined at step 128 by adding the best path Q(origin(q)) from an initial state to an origin node origin(q) of arc q when i output symbols are observed, at step 122.

The arc index q is increased by 1 for additional processing at step 123. Then, the arc q to the node s is compared with the total number Q at step 124.

If the arc q is not larger than the total number Q at step 124, the above process is repeated. When all arcs and null-arcs for one node are processed, the node index s is increased by 1 at step 129 to process the next node s.

After the node s is increased at step 129, it is determined at step 130 whether all the nodes S are processed.

If s is not larger than S, the above process is repeated, and if s is larger than S, the output symbol (chain code) index i is increased by 1 at step 131. At this time, the best path for output symbol i is searched via the circular HMMs of FIG. 8 by being compared with all the chain codes K.

If the best path is found in the interconnected character and ligature HMMs of FIG. 8 at step 442, the results of the word recognition process are output at step 443.

OUTPUT OF WORD RECOGNITION RESULTS

Figure 13:
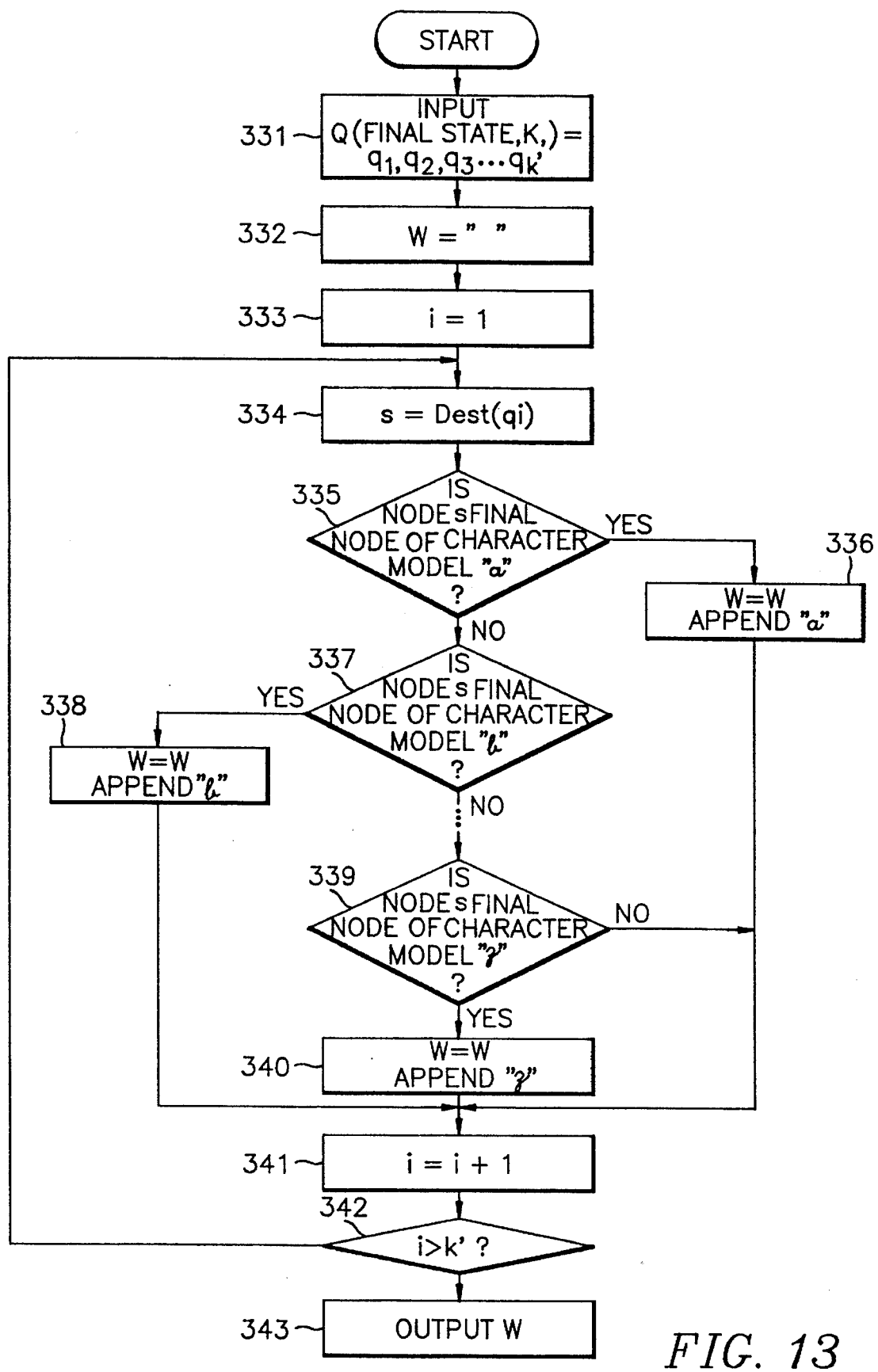
FIG. 13 is a flow chart showing the output of a word recognition result according to an embodiment constructed according to the principles of the present invention.

The embodiment for reading the results of the word recognition process at step 443 of FIG. 4C will be described in detail with reference to FIG. 13.

All arcs q1, q2, ..., qk' (for k': number of arcs or null-arcs on the best path) selected on the best path are input to Q (final node, K) (for K: number of output symbols) at step 331.

The word to be recognized is set to a null-string, i.e. W=" "at step 332, and the first arc or null-arc on the best path is assigned at step 333 (i.e. i=1).

The current node s is assigned to a destination node Dest(qi) at step 334, and it is determined whether node s is a final node of one of the a to z character models at steps 335, 337 and 339. If the node s is a final node of a corresponding model, the corresponding character is recognized at steps 336, 338 or 340 and is sequentially appended to the previously recognized character. The index i of arc or null-arc on the next optimal path is increased by 1 at step 341, and the above process is repeated until the number of arcs or null-arcs, k', on the optimal path of step 331 arrives. When all processing is ended after repetition of the above process, the result is output through the output device 105 at step 343.

ASCII, including numerical characters, is omitted in the present embodiment, but it can be implemented by those skilled in the art without deviating from the basic principles of the present invention.

As described above, according to the present invention, HMMs are used in character recognition. After ligatures and characters are used to train HMMs, the circular HMMs are constituted, thereby enabling recognition of an unknown word composed of an arbitrary number of characters, without an additional separator. Even if extended change in characters is generated when the characters are handwritten for HMMs, the present invention can effectively recognize the characters. Moreover, a handwritten word including both discrete style and cursive style characters can be recognized using the ligature models.

What is claimed is:

1. A method of sequentially receiving on-line input data as sequences of coordinates and recognizing a word represented by said input data in a data recognition system, said method comprising the steps of:

training said system to recognize individual character units by entering said character units into said system, fitting said character units with first corresponding imaginary strokes, preprocessing said character units, converting said character units into corresponding sequences of first chain codes and representing said first chain codes in first hidden Markov models;

training said system to recognize ligatures connecting said character units by entering said ligatures into said system, fitting said ligatures with second corresponding imaginary strokes, preprocessing said ligatures, converting said ligatures into corresponding sequences of second chain codes and representing said second chain codes in second hidden Markov models;

interconnecting said first hidden Markov models with said second hidden Markov models to form a circularly connected hidden Markov model by connecting a first node of every one of said first hidden Markov models to a global initial state and a last node of every one of said first hidden Markov models to a global final state, and connecting said last node of each one of said first hidden Markov models to a first node of every one of said second hidden Markov models and a last node of each one of said second hidden Markov models to said first node of every one of said first hidden Markov models; and recognizing said word represented by said input data by entering said word into said system, fitting said word with third corresponding imaginary strokes, preprocessing said word, converting said word into corresponding sequences of third chain codes and passing said third chain codes through said circularly connected hidden Markov model.

2. The method as claimed in claim 1, wherein said preprocessing of said word comprises connecting said third corresponding imaginary strokes to actual strokes of said word to generate a merged stroke, and resampling with a predetermined length each distance between adjacent points of said merged stroke.

3. The method as claimed in claim 1, further comprised of said word being entered into said system by a user writing said word by hand on an electronic tablet.

4. The method as claimed in claim 1, wherein in said step of recognizing said word, an optimal path in said circularly connected hidden Markov model providing a highest probability of occurrence is selected based on said third chain codes.

5. The method as claimed in claim 4, further comprised of said optimal path being selected using a Viterbi algorithm.

6. A method of sequentially receiving on-line input data representative of actual strokes of characters and ligatures connecting said characters and recognizing a word represented by said characters wherein said input data is represented as sequences of coordinates, said method comprising the steps of:

receiving and storing said input data representative of said actual strokes;

identifying any severed portions existing between said actual strokes;

inserting an imaginary stroke at each one of said severed portions;

merging, as one stroke, said actual strokes and each said imaginary stroke to form a merged stroke;

normalizing distances between adjacent coordinates in said merged stroke to generate a normalized stroke;

converting data representative of said normalized stroke into a plurality of chain codes;

finding an optimal path in a circularly formed hidden Markov model comprised of interconnected character and ligature models, said circularly formed hidden Markov model constructed in a training mode by connecting a first node of every one of said character models to a global initial state and a last node of every one of said character models to a global final state, and connecting said last node of each one of said character models to a first node of every one of said ligature models and a last node of each one of said ligature models to said first node of every one of said character models; and recognizing said word represented by said characters, including both discrete style and cursive style characters, in dependence upon said optimal path.

7. The method as claimed in claim 6, wherein said imaginary stroke is inserted at each one of said severed portions to connect an ending point of a first one of said actual strokes with a starting point of a second one of said actual strokes, said second one of said actual strokes being entered by a user immediately following said first one of said actual strokes.

8. The method of claim 6, further comprised of said actual strokes being written on a variable visual display by a user via an electrical pen capable of altering said variable visual display.

9. A method of sequentially receiving on-line input data, processing said input data and recognizing a word represented by said input data in a data recognition system, said method comprising the steps of:

receiving said input data representative of said word to be recognized as a sequence of original coordinate points, said word being formed by cursive strokes;

selecting a unit length in dependence upon physical dimensions of said cursive strokes;

calculating normalized coordinate points wherein adjacent ones of said normalized coordinate points are separated by a distance equal to said unit length;

generating chain codes in dependence upon angles between said adjacent ones of said normalized coordinate points;

inputting said chain codes into a circularly formed hidden Markov model comprised of interconnected character Markov models and ligature Markov models, said circularly formed hidden Markov model having been constructed by connecting a first node of every one of said character Markov models to a global initial state and a last node of every one of said character Markov models to a global final state and connecting said last node of each one of said character Markov models to a first node of every one of said ligature Markov models and a last node of each one of said ligature Markov models to said first node of every one of said character Markov models; and recognizing said word represented by said input data by finding an optimal path in said circularly formed hidden Markov model.

10. The method as claimed in claim 9, wherein said normalized coordinate points represented by $(x',y')$ are calculated by sequentially generating successive start points $SP(x_i,y_i)$ and final points $FP(x_{i+1},y_{i+1})$ separated by said unit length represented by $U$, according to the following equations:

$$x' = \frac{U'FP \cdot x_{i+1} + (D - U)'SP \cdot x_i}{D}$$

$$y' = \frac{U'FP \cdot y_{i+1} + (D - U)'SP \cdot y_i}{D}$$

wherein $D$ represents an initial distance between first and second ones of said original coordinate points.

11. The method of claim 9, wherein said system receives said input data by a user writing said word to be recognized by hand on a variable visual display with an electrical pen capable of altering said variable visual display.

12. The method of claim 11, wherein said step of recognizing said word further comprises the substeps of:

identifying a plurality of paths in said circularly formed hidden Markov model; and selecting said optimal path from among said plurality of paths using a Viterbi algorithm.

13. The method of claim 9, wherein said step of recognizing said word further comprises the substeps of:

identifying a plurality of paths in said circularly formed hidden Markov model; and selecting said optimal path from among said plurality of paths using a Viterbi algorithm.

14. A data recognition method, comprising the steps of:

determining whether one of a training process and a recognition process for recognition of data is activated, said training process being a preparatory step for data recognition;

determining whether a character training mode or a ligature training mode is activated when said training process has been activated;

receiving first coordinate data representative of actual strokes of cursively written characters when said character training mode has been activated and receiving second coordinate data representative of actual strokes of cursively written ligatures when said ligature training mode has been activated;

fitting said actual strokes of said cursively written characters with first imaginary strokes during said character training mode and fitting said actual strokes of said cursively written ligatures with second imaginary strokes during said ligature training mode;

generating first merged strokes comprised of said actual strokes of said cursively written characters and said first imaginary strokes during said character training mode, and generating second merged strokes comprised of said actual strokes of said cursively written ligatures and said second imaginary strokes during said ligature training mode;

normalizing distances between adjacent points of said first merged strokes during said character training mode to generate first normalized strokes, and normalizing distances between adjacent points of said second merged strokes during said ligature training mode to generate second normalized strokes;

converting directional angles of vectors connecting adjacent points of said first normalized strokes into a first plurality of chain codes during said character training mode, and converting directional angles of vectors connecting adjacent points of said second normalized strokes into a second plurality of chain codes during said ligature training mode;

feeding said first plurality of chain codes into character hidden Markov models during said character training mode, and feeding said second plurality of chain codes into ligature hidden Markov models during said ligature training mode;

checking whether said training process is complete and connecting said character hidden Markov models to said ligature hidden Markov models to construct a circularly formed hidden Markov model when said training process is complete;

activating said recognition process;

receiving, for recognition, third coordinate data representative of selected ones of said actual strokes of said cursively written characters and ligatures, said selected ones of said actual strokes of said cursively written characters and ligatures comprising a word to be recognized;

fitting said selected ones of said actual strokes of said cursively written characters and ligatures with third imaginary strokes;

generating a third merged stroke comprised of said selected ones of said actual strokes of said cursively written characters and ligatures and said third imaginary strokes;

normalizing distances between adjacent points of said third merged stroke to generate a third normalized stroke;

converting said third normalized stroke into a third plurality of chain codes;

feeding said third plurality of chain codes into said circularly formed hidden Markov model; and performing word recognition on a basis of an optimal path in said circularly formed hidden Markov model.

15. The method of claim 14, further comprised of said step of receiving said first and second coordinate data being performed by a user writing said actual strokes of said cursively written characters and ligatures on a variable visual display with an electrical pen capable of altering said variable visual display.

16. The method as claimed in claim 14, wherein said step of connecting said character hidden Markov models to said ligature hidden Markov models comprises the steps of:

receiving said character hidden Markov models and interconnecting said character hidden Markov models by connecting a first node of every one of said character hidden Markov models to a global initial state and a last node of every one of said character hidden Markov models to a global final state; and connecting said ligature hidden Markov models to said character hidden Markov models by connecting said last node of each one of said character hidden Markov models to a first node of every one of said ligature hidden Markov models and a last node of each one of said ligature hidden Markov models to said first node of every one of said character hidden Markov models.

17. The method of claim 14, further comprised of performing said word recognition by:

identifying a plurality of paths in said circularly formed hidden Markov model; and selecting said optimal path from among said plurality of paths using a Viterbi algorithm.

18. A data recognition system, comprising:

first means for determining whether one of a training process that is a prepatory step for data recognition and a recognition process for recognizing data has been activated;

second means for providing a character training mode and a ligature training mode during said training process;

third means for receiving first coordinate data representative of actual strokes of cursively written characters during said character training mode and for receiving second coordinate data representative of cursively written ligatures during said ligature training mode;

fourth means for fitting said actual strokes of said cursively written characters with first imaginary strokes during said character training mode and for fitting said actual strokes of said cursively written ligatures with second imaginary strokes during said ligature training mode;

fifth means for generating first merged strokes comprised of said actual strokes of said cursively written characters and said first imaginary strokes during said character training mode, and generating second merged strokes comprised of said actual strokes of said cursively written ligatures and said second imaginary strokes during said ligature training mode;

sixth means for normalizing distances between adjacent points of said first merged strokes during said character training mode to generate first normalized strokes, and normalizing distances between adjacent points of said second merged strokes during said ligature training mode to generate second normalized strokes;

seventh means for converting directional angles of vectors connecting adjacent points of said first normalized strokes into a first plurality of chain codes during said character training mode, and for converting directional angles of vectors connecting adjacent points of said second normalized strokes into a second plurality of chain codes during said ligature training mode;

eighth means for recording training results by feeding said first plurality of chain codes into character hidden Markov models during said character training mode, and feeding said second plurality of chain codes into ligature hidden Markov models during said ligature training mode;

ninth means for checking whether said training process is complete, and interconnecting said character hidden Markov models to said ligature hidden Markov models to construct a circularly formed hidden Markov model when said training process is complete;

tenth means for activating said recognition process and receiving, for recognition, data representative of selected ones of said actual strokes of said cursively written characters and ligatures when construction of said circularly formed hidden Markov model is complete, fitting said selected ones of said actual strokes of said cursively written characters and ligatures with third imaginary strokes, generating a third merged stroke comprised of said selected ones of said actual strokes of said cursively written characters and ligatures and said third imaginary strokes, normalizing distances between adjacent points of said third merged stroke to generate a third normalized stroke and converting said third normalized stroke into a third plurality of chain codes;

eleventh means for feeding said third plurality of chain codes converted by said tenth means into said circularly formed hidden Markov model; and twelfth means for providing a word represented by said selected ones of said actual strokes of said cursively written characters and ligatures, said word corresponding to an optimal path found in said circularly formed hidden Markov model.

19. The system of claim 18, further comprised of said ninth means constructing said circularly formed hidden Markov model by connecting a first node of every one of said character hidden Markov models to a global initial state and a last node of every one of said character hidden Markov models to a global final state, and further by connecting said last node of each one of said character hidden Markov models to every one of said ligature hidden Markov models and a last node of each one of said ligature hidden Markov models to said first node of every one of said character hidden Markov models.

20. A method for training a data recognition system to recognize words comprised of characters and ligatures connecting said characters, said method comprising the steps of:

inputting coordinates of actual strokes representative of said characters and ligatures;

fitting imaginary strokes between said actual strokes to generate merged strokes comprised of said actual strokes and said imaginary strokes;

normalizing distances between adjacent points of said merged strokes to generate normalized strokes;

converting directional angles of vectors connecting adjacent points of said normalized strokes into a plurality of chain codes;

recording training results by incorporating said plurality of chain codes into character Markov models and ligature Markov models; and interconnecting said character Markov models and said ligature Markov models to generate a circularly formed hidden Markov model for enabling recognition of said words comprised of said characters and ligatures, said circularly formed hidden Markov model being generated by connecting a first node of every one of said character Markov models to a global initial state and a last node of every one of said character Markov models to a global final state and connecting said last node of each one of said character Markov models to a first node of every one of said ligature Markov models and a last node of each one of said ligature Markov models to said first node of every one of said character Markov models.

21. The method as claimed in claim 20, wherein said step of fitting imaginary strokes between said actual strokes further comprises the substeps of:

selecting consecutive ending points of first ones of said actual strokes and starting points of second ones of said actual strokes, said second ones of said actual strokes being directly adjacent to said first ones of said actual strokes; and inserting said imaginary strokes between said ending points of said first ones of said actual strokes and said starting points of said second ones of said actual strokes.

22. The method as claimed in claim 20, wherein said actual strokes representative of said characters and ligatures are input on a variable visual display by a user via an electrical pen capable of altering said variable visual display.

23. The method as claimed in claim 20, wherein said step of interconnecting said character Markov models and said ligature Markov models comprises the steps of:

connecting a first node of each one of said character Markov models to a global initial state with a null-arc and a last node of each one of said character Markov models to a final state with said null-arc, said connection step being sequentially performed for every one of said character Markov models in said circular hidden Markov model; and connecting said last node of each one of said character Markov models to a first node of every one of said ligature Markov models and a last node of each one of said ligature Markov models to said first node of every one of said character Markov models 21, further comprised of said actual strokes representative of said characters and ligatures being input on a variable visual display by a user via an electrical pen capable of altering said variable visual display.

24. A method for recognizing words in a character recognition system, comprising the steps of:

training said system to recognize individual characters units and corresponding ligatures connecting said individual character units by entering handwritten representations of said individual character units and said corresponding ligatures into said system, and constructing a circularly formed hidden Markov model comprised of character Markov models interconnected with ligature Markov models in dependence upon said handwritten representations of said individual character units and said corresponding ligatures, said circularly formed hidden Markov model being constructed by connecting a first node of every one of said character Markov models to a global initial state and a last node of every one of said character Markov models to a global final state and connecting said last node of each one of said character Markov models to a first node of every one of said ligature Markov models and a last node of each one of said ligature Markov models to said first node of every one of said character Markov models;

inputting a sequence of coordinates of actual strokes representative of a word to be recognized, said word comprised of selected ones of said individual character units and said corresponding ligatures;

fitting imaginary strokes between said actual strokes to generate a merged stroke comprised of said actual strokes and said imaginary strokes;

normalizing distances between adjacent points of said merged stroke to generate a normalized stroke;

converting directional angles of vectors connecting adjacent points of said normalized stroke into a plurality of chain codes; and locating an optimal path in said circularly formed hidden Markov model and outputting said word represented by said actual strokes.

25. The method for recognizing words as claimed in claim 24, further comprised of said actual strokes representative of said word to be recognized being entered on a variable visual display by a user via an electrical pen capable of altering said variable visual display.

26. The method for recognizing words as claimed in claim 24, further comprised of said handwritten representations of said individual character units and said corresponding ligatures being entered into said system on a variable visual display by a user via an electrical pen capable of altering said variable visual display.

27. The method for recognizing words as claimed in claim 24, further comprised of said optimal path being selected from among a plurality of paths within said circularly formed hidden Markov model according to a Viterbi algorithm.

28. The method for recognizing words as claimed in claim 24, wherein said step of fitting said imaginary strokes between said actual strokes comprises the substeps of:

selecting consecutive ending points of first ones of said actual strokes and starting points of second ones of said actual strokes, said second ones of said actual strokes being directly adjacent to said first ones of said actual strokes; and inserting said imaginary strokes between said ending points of said first ones of said actual strokes and said starting points of said second ones of said actual strokes.

29. A character training system for enabling recognition of a word comprised of characters and ligatures connecting said characters, said system comprising:

means for inputting coordinates of actual strokes representative of said characters and ligatures;

means for fitting imaginary strokes between said actual strokes to generate merged strokes comprised of said actual strokes and said imaginary strokes;

means for normalizing distances between adjacent points of said merged strokes to generate normalized strokes;

means for converting directional angles of vectors connecting adjacent points of said normalized strokes into a plurality of chain codes;

means for incorporating said plurality of chain codes into character Markov models and ligature Markov models; and means for interconnecting said character Markov models and said ligature Markov models to form a circularly formed hidden Markov model for enabling recognition of said word, said interconnecting means connecting a first node of every one of said character Markov models to a global initial state and a last node of every one of said character Markov models to a final state, and for connecting said last node of each one of said character Markov models to a first node of every one of said ligature Markov models and a last node of each one of said ligature Markov models to said first node of every one of said character Markov models.

30. The character training system as claimed in claim 29, further comprised of said actual strokes being written on a variable visual display by a user via an electrical pen capable of altering said variable visual display.

* * * * *